United States Patent
Matsumoto et al.

(10) Patent No.: US 8,938,002 B2
(45) Date of Patent: Jan. 20, 2015

(54) DATA PROCESSING APPARATUS, DATA PROCESSING METHOD, AND PROGRAM

(75) Inventors: Hideyuki Matsumoto, Tokyo (JP); Yuichi Mizutani, Tokyo (JP)

(73) Assignee: Sony Corporation, Tokyo (JP)

( * ) Notice: Subject to any disclaimer, the term of this patent is extended or adjusted under 35 U.S.C. 154(b) by 482 days.

(21) Appl. No.: 13/380,758

(22) PCT Filed: Jun. 23, 2010

(86) PCT No.: PCT/JP2010/060603
§ 371 (c)(1),
(2), (4) Date: Dec. 23, 2011

(87) PCT Pub. No.: WO2011/001863
PCT Pub. Date: Jan. 6, 2011

(65) Prior Publication Data
US 2012/0110284 A1 May 3, 2012

(30) Foreign Application Priority Data
Jun. 30, 2009 (JP) ................................ 2009-155438

(51) Int. Cl.
*G06F 12/00* (2006.01)
*H04N 7/173* (2011.01)
(Continued)

(52) U.S. Cl.
CPC .............. *H04N 7/173* (2013.01); *H04H 40/90* (2013.01); *H04H 60/11* (2013.01); *H04N 7/167* (2013.01); *H04N 21/4347* (2013.01); *H04N 21/4383* (2013.01); *H04N 21/44004* (2013.01)
USPC ... 375/240.02; 370/535; 711/154; 375/240.27; 375/E7.126

(58) Field of Classification Search
None
See application file for complete search history.

(56) References Cited

U.S. PATENT DOCUMENTS

| 6,748,033 B1 | 6/2004 | Shiraishi et al. | |
|---|---|---|---|
| 2007/0064588 A1* | 3/2007 | Kisoda et al. | 370/208 |
| 2008/0159338 A1* | 7/2008 | Iida | 370/535 |

FOREIGN PATENT DOCUMENTS

| CA | 2 337 008 | 7/1999 |
|---|---|---|
| CN | 1309838 | 8/2001 |

(Continued)

OTHER PUBLICATIONS

Bercovici et al. "Contiguous Receive Buffer for TDM Data Streams". IP.com Disclosure No. IPCOM000010796D. Motorola, Inc. Jan. 22, 2003.*

(Continued)

*Primary Examiner* — Christian P. Chace
*Assistant Examiner* — Brendan Lillis
(74) *Attorney, Agent, or Firm* — Oblon, Spivak, McClelland, Maier & Neustadt, L.L.P.

(57) ABSTRACT

A data processing apparatus, a data processing method, and a program that are configured to prevent (or lower) the increase in scale and cost of the apparatus. A read/write control portion executes read/write control in which slots subject to extraction of two or more slots in one frame that is a collection of two or more slots each of which is a unit of error correction coding are written to a ring buffer and the slots subject to extraction in one frame written to the ring buffer are read within the unit time. When slots subject to extraction are changed, an output portion executes output processing in which dummy data outputted from a dummy data output portion are outputted with a timing immediately before a change start frame that is a frame from which the change of slots subject to extraction is started and, slots subject to extraction read from the ring buffer are outputted for frames subsequent to the change start frame. The present disclosure is applicable to reception apparatuses for receiving BS digital broadcasting, for example.

17 Claims, 23 Drawing Sheets

(51) Int. Cl.
*H04H 40/90* (2008.01)
*H04H 60/11* (2008.01)
*H04N 7/167* (2011.01)
*H04N 21/434* (2011.01)
*H04N 21/438* (2011.01)
*H04N 21/44* (2011.01)

(56) References Cited

FOREIGN PATENT DOCUMENTS

| | | |
|---|---|---|
| CN | 1335995 | 2/2002 |
| DE | 1100202 | 2/1961 |
| EP | 1 100 202 | 5/2001 |
| EP | 1 125 299 | 8/2001 |
| JP | 9-218749 | 8/1997 |
| JP | 10-191257 | 7/1998 |
| JP | 2000-36765 | 2/2000 |
| JP | 2000-269829 | 9/2000 |
| JP | 2001-67265 | 3/2001 |
| JP | 2001-332980 | 11/2001 |
| JP | 2002-10252 | 1/2002 |
| JP | 2006-148825 | 6/2006 |
| TW | 492016 | 6/2002 |
| WO | WO 00/04645 | 1/2000 |
| WO | WO 01/15173 | 3/2001 |

OTHER PUBLICATIONS

Baratz et al. "Dynamic Slot Assignment in TDM Frames". IP.com No. IPCOM000039218D. IBM Technical Disclosure Bulletin (TDB 05-87 P.5225-5228). Jan. 5, 1987.*

Hatanaka et al. "Implementation of psk demodulator for digital bs/cs broadcasting system". Circuits and Systems, 2003. ISCAS '03. Proceedings of the 2003 International Symposium on Circuits and Systems (vol. 2) May 25-28, 2003.*

Saito et al. "ISDB-S—Satellite Transmission System for Advanced Multimedia Services Provided by Integrated Services Digital Broadcasting". ABU Technical Review No. 189. 2000 NHK (Japan Broadcasting Corporation).*

Office Action issued Sep. 5, 2013 in Japanese Patent Application No. 2009-155438.

* cited by examiner

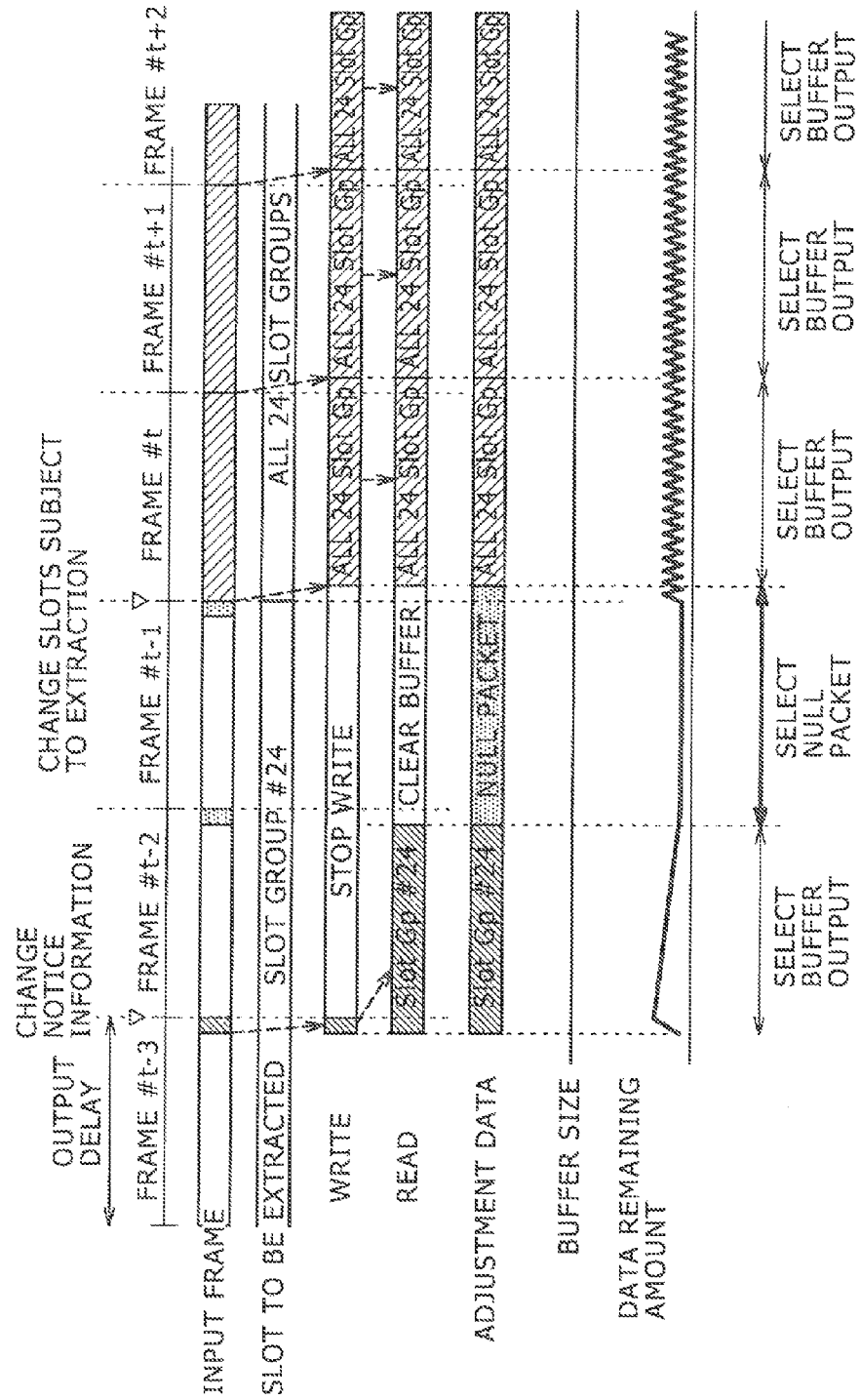

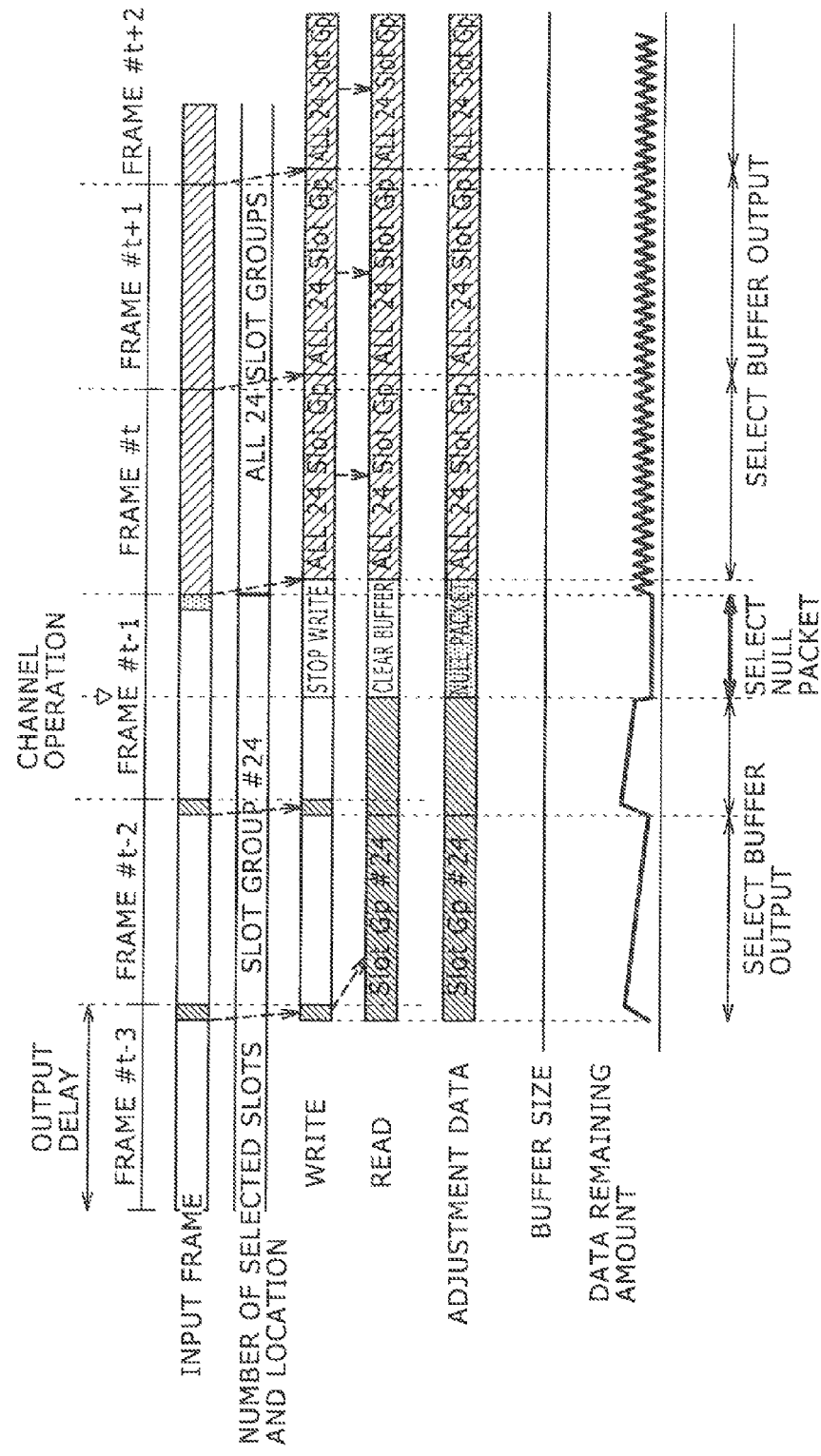

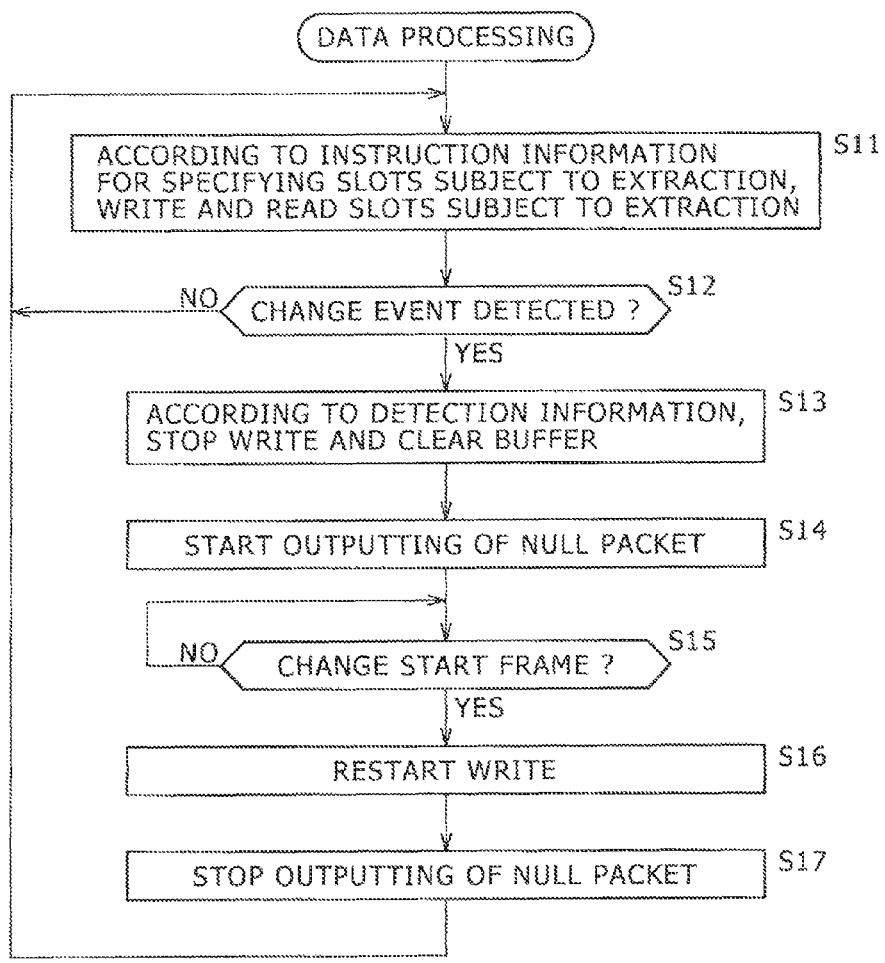

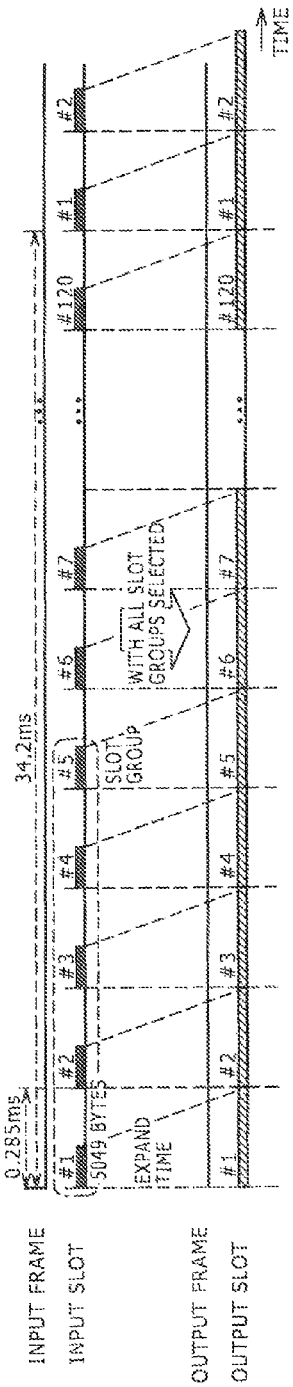
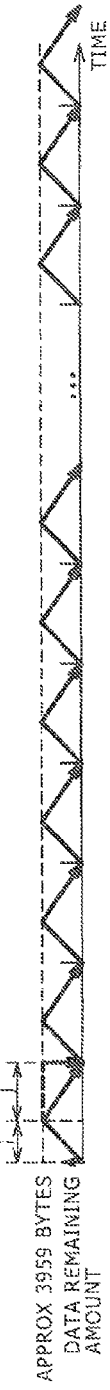
FIG. 24A
FIG. 24B
FIG. 24C

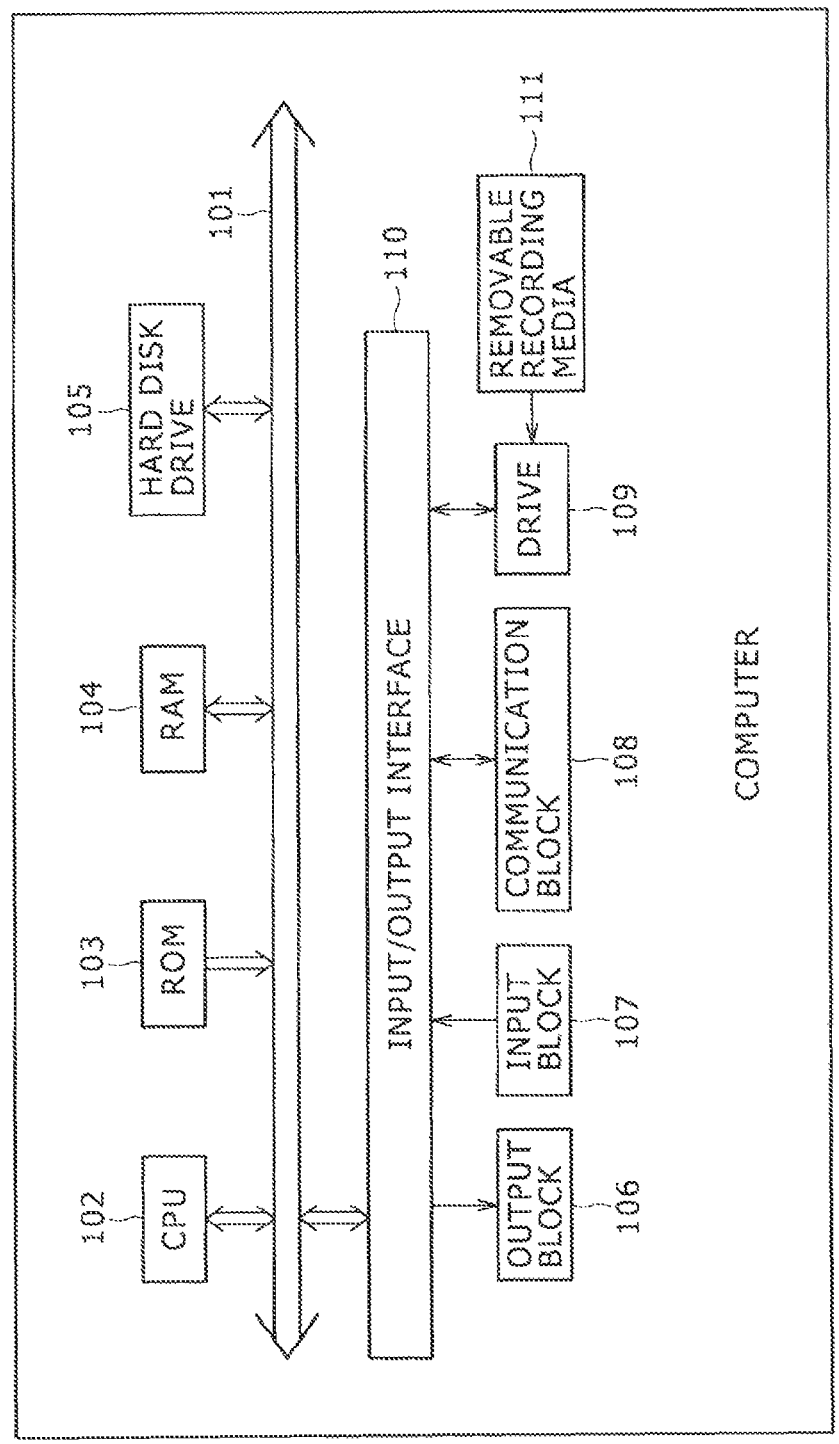

DATA PROCESSING APPARATUS, DATA PROCESSING METHOD, AND PROGRAM

TECHNICAL FIELD

The present invention relates generally to a data processing apparatus, a data processing method, and a program and, more particularly, to a data processing apparatus, a data processing method, and a program that are configured to prevent the scale and cost of apparatuses from being increased.

BACKGROUND ART

Currently, the BS digital broadcasting uses ISDB-S (Satellite Integrated Services Digital Broadcasting) scheme.

In the ISDB-S scheme (hereafter referred to also as the current BS), one of three modulation schemes, namely, BPSK (Binary Phase Shift Keying), QPSK (Quadrature Phase Shift Keying), and 8PSK (Phase Shift Keying), can be selected for the modulation scheme in order to digitally modulate the symbols of main signals that is the primary information to be transmitted, such as image data as a program, for example.

Meanwhile, in order to execute the transmission of higher mass capacities, the upgrading of the ISDB-S scheme (thereafter referred to also as advanced BS) has been under review (refer to Non-Patent Document 1 for example).

The advanced BS allows the choice of a modulation scheme for digitally modulating main signal symbols from five modulation schemes, namely, 16APSK (Amplitude Phase Shift Keying) and 32APSK in addition to the above-mentioned BPSK, QPSK, and 8PSK, thereby enhancing the transmission efficiency.

In addition, the advanced BS uses a strong error correction code, namely, the LDPC (Low Density Parity Check) code, as a countermeasure against the errors on transmission paths that increase as the transmission efficiency is enhanced.

PRIOR ART DOCUMENT

Non-Patent Document

Non-Patent Document 1: Akinori Hashimoto, Yoichi Suzuki, Hisashi Sujikai, Shoji Tanaka, and Kazuyoshi Shogen, "A Study on the Advanced ISDB-S System," Proceedings of the IEICE General Conference 2007, B-3-7, 2007.3.

SUMMARY OF INVENTION

Technical Problems

In the current BS and the advanced BS, the unit of error correction coding is referred to as a slot.

In the current BS, one slot is 204 bytes wide and a frame that is the transmission unit (the processing unit in one transponder) is made up of a maximum of 48 slots.

In a transmission apparatus based on the current BS, program data (image data, audio data, and so on) for example as a main signal is transmitted as included in one or more slots of each frame.

In a reception apparatus based on the current BS, slots in which data of a desired program is included are extracted from each frame to be supplied to a decoder.

To be more specific, program data is included in a slot in the form of TS (Transport Stream) packet including encoded data obtained by encoding image data for example by MPEG (Moving Picture Experts Group).

In the reception apparatus based on the current BS, a slot in which data of a desired program is included is extracted from each frame. Further, in the reception apparatus, a slot extracted from one frame with a time of one frame being a unit time is supplied to the decoder within the unit time.

It should be noted that in which slot among the 48 (a maximum of) slots making up a frame the data of a certain program is included is transmitted from the transmission apparatus as included in TMCC (Transmission Multiplexing Configuration Control) information.

As described above, in the reception apparatus based on the current BS, in order to supply the slot extracted from one frame to the decoder within the unit time, the slot extracted from one frame is written to a buffer and the slot written to the buffer is read within the unit time.

To be more specific, in order to supply the slot (or the TS packet included therein) to the decoder realtime, the reception apparatus based on the current BS writes the slot extracted from one frame to the buffer and then read the written slot, thereby adjusting a rate (a rate at which the slot extracted from the one frame is supplied in the time of one frame) equivalent to the real time.

Meanwhile, because the advanced BS uses the LDPC code that is a strong error correction code, the amount of the data handled in the transmission apparatus and the reception apparatus becomes huge.

To be more specific, with the advanced BS for example, one slot is a maximum of 5049 bytes wide and one frame is configured by a maximum of 120 slots.

Therefore, while the data amount of one frame in the current BS is (a maximum of) 204 bytes×48 slots, the data amount of one frame in the advanced BS is (a maximum of) 5049 bytes×120 slots, amounting to a huge quantity as compared with the current BS.

As a result, if the same data processing as executed in the reception apparatus based on the current BS is executed in the reception apparatus based on the advanced BS as the data processing for adjusting the rate of slots to be supplied to the decoder, a buffer of a huge capacity is required as compared with that of the current BS for a buffer to which the slot extracted from one frame is written, thereby leading to an increased scale and an increased cost of the apparatus.

It is therefore an object of the present invention to prevent (or lower) the increased scale and the increased cost of the apparatuses.

Technical Solution

In carrying out the invention and according to one aspect thereof, there is provided a data processing apparatus or a program for causing a computer to function as this data processing apparatus. This data processing apparatus has storage means configured to store, as a slot subject to extraction, at least a part of slots of a plurality of slots making up a frame that is a collection of a plurality of slots each providing a unit of error correction coding; read/write control means configured to execute read/write control in which the slot subject to extraction of the plurality of slots in one frame is written to the storage means and the slot subject to extraction of one frame written to the storage means is read within a preset unit time; dummy data output means configured to output dummy data that is data of dummy; and output means configured to execute output processing in which, when the slot subject to extraction is changed, the dummy data is outputted with a timing immediately before a change start frame from which the change of the slot subject to extraction is started and, for frames subsequent to the change start frame, the slot subject to extraction read from the storage means is outputted.

In carrying out the invention and according to another aspect thereof, there is provided a data processing method. This data processing method has the steps of: storing, as a slot subject to extraction, at least a part of slots of a plurality of slots making up a frame that is a collection of a plurality of slots each providing a unit of error correction coding to storage means; executing read/write control in which the slot subject to extraction of the plurality of slots in one frame is written to the storage means and the slot subject to extraction of one frame written to the storage means is read within a preset unit time; outputting dummy data that is data of dummy; and executing output processing in which, when the slot subject to extraction is changed, the dummy data is outputted with a timing immediately before a change start frame from which the change of the slot subject to extraction is started and, for frames subsequent to the change start frame, the slot subject to extraction read from the storage means is outputted.

In one aspect of the invention, to storage means for storing at least a part of slots of two or more slots making up a frame that is a collection of two or more slots each providing a unit of error correction coding, as the slot subject to extraction, this slot subject to extraction among the two or more slots making up one frame is written and the slot subject to extraction written to the storage means is read within a preset unit time. Next, when the slot subject to extraction is changed to another, the dummy data is outputted with a timing of the frame immediately before a change start frame from which the change of the slot subject to extraction is started and, for frames subsequent to the change start frame, the slot subject to extraction read from the storage means is outputted.

It should be noted that the data processing apparatus may be a standalone apparatus or an internal block making up one apparatus.

The program can be provided by transmission through a transmission media or as recorded to a recording media.

Effects of the Invention

According to one aspect of the present invention, the increased scale of the apparatus and the increased cost thereof may be prevented.

BRIEF DESCRIPTION OF DRAWINGS

FIG. 21 is a timing chart indicative of an operation of the TS reproduction block 35 if slots subject to extraction are changed when slots including program data are changed at switching between programs in the transmission apparatus.

FIG. 22 is a timing chart indicative of an operation of the TS reproduction block 35 if slots subject to extraction are changed when a user executes a channel operation in the transmission apparatus.

FIG. 23 is a flowchart indicative of data processing to be executed by the TS reproduction block 35.

FIG. 24 is a diagram describing capacities required for the ring buffer 71.

FIG. 25 is a block diagram illustrating an exemplary configuration of a computer applied with the present invention, practiced as one embodiment of the invention.

MODE FOR CARRYING OUT THE INVENTION

[Description of the Current BS]

The following describes embodiments of the present invention. As a preliminary description, the current BS will be explained.

Figure 1:
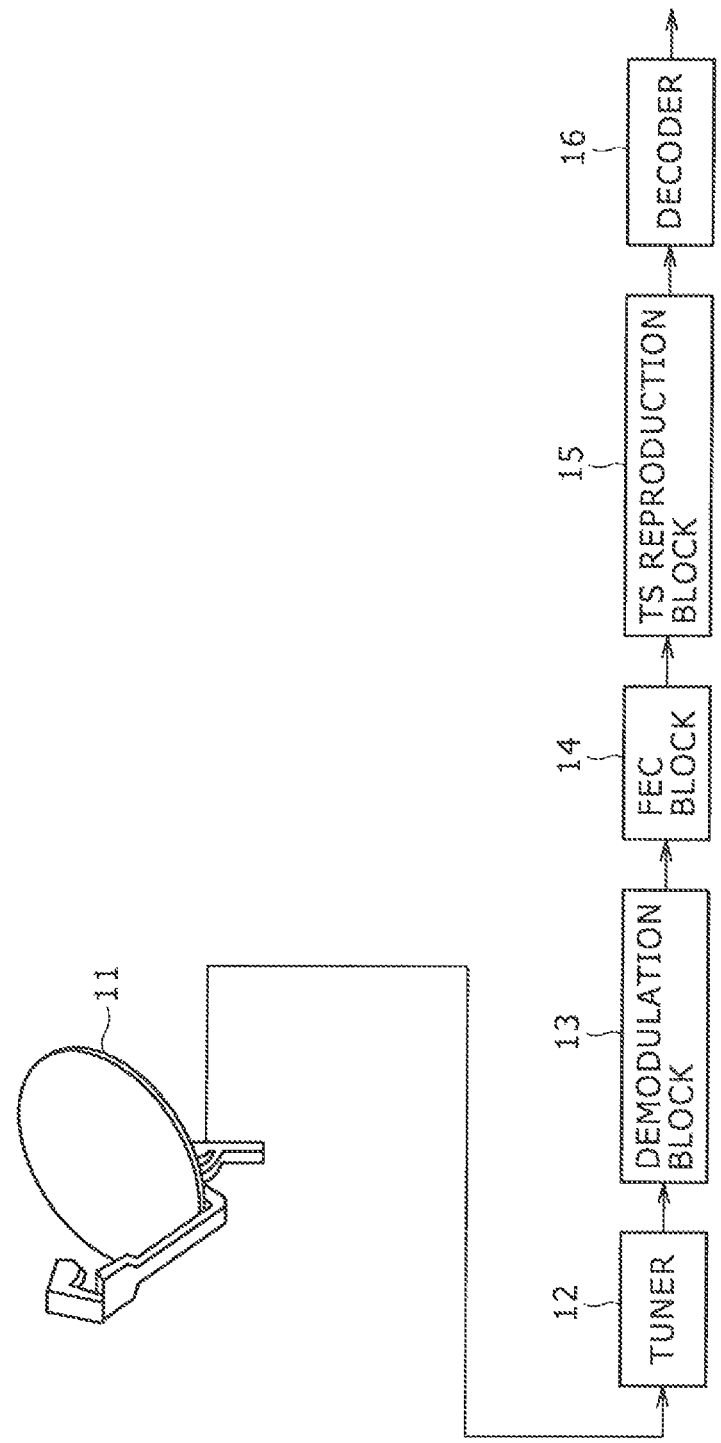
FIG. 1 is a block diagam illustrating, an exemplary configuration of a reception apparatus based on the current TS.

Referring to FIG. 1, there is shown a block diagram illustrating an exemplary configuration of a reception apparatus based on the current BS.

From a transmission apparatus (not shown) based on the current BS, a modulation signal obtained by digital modulation comes.

An antenna 11 receives the modulation signal coming from the transmission apparatus (via a BS not shown) and supplies the received modulation signal to a tuner 12.

The tuner 12 extracts (or detects) a modulation signal of a predetermined frequency band and supplies the extracted modulation signal to a demodulation block 13.

The demodulation block 13 demodulates the modulation signal received from the tuner 12 and supplies a demodulation signal obtained as a result of the demodulation to an FEC (Forward Error Correction) block 14.

The FEC block 14 executes error correction processing on the demodulation signal supplied from the demodulation block 13 (namely, decodes an error correction code included in the demodulation signal) and supplies a frame made up of two or more slots obtained as a result of the error correction processing to the TS reproduction block 15.

The TS reproduction block 15 extracts slots subject to extraction (or slots predetermined to be extracted) from the frame supplied from the FEC block 14 with at least some of the two or more slots making up the frame, that is, slots in which data of a desired program is included, for example, being as the slots subject to extraction from the frame and supplies these slots subject to extraction to the output block 16 while adjusting the rates of these slots subject to extraction.

The decoder 16 MPEG-decodes the encoded data in TS packets included in the slot (the slot subject to extraction) supplied from the TS reproduction block 15 and outputs image data and audio data obtained as a result of the MPEG decoding.

Figure 2:
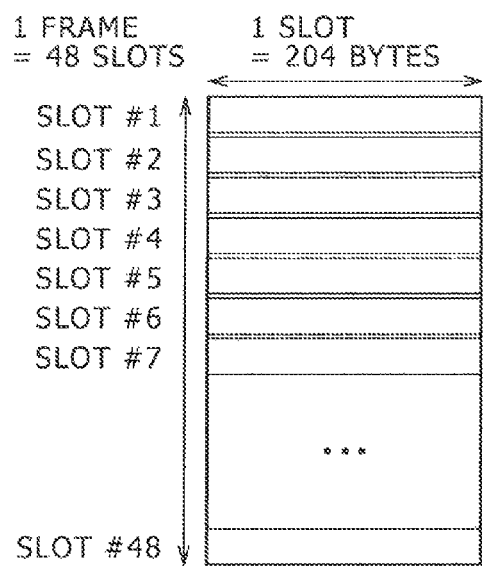
FIG. 2 is a diagram illustrating a frame based on the current BS.

Referring to FIG. 2, there is shown a diagram indicative of a frame (a frame based on the current BS) that is supplied from the FEC block 14 to the TS reproduction block 15 shown in FIG. 1.

As described before, one frame based on the current BS is made up of a maximum of 48 slots.

One slot based on the current BS is 204 bytes (in size); therefore, one frame made up of 48 slots is 78336 bits=48 slots×204 bytes×8 bits.

It should be noted that each slot includes a TS packet including the encoded data obtained by MPEG-encoding image data and so on.

Figure 3:
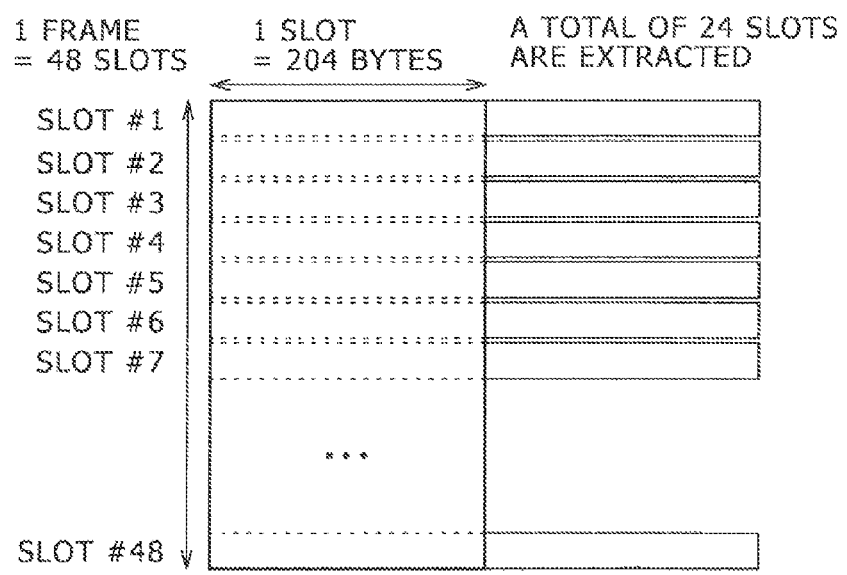
FIG. 3 is a diagram describing the extraction of slots from a frame to be executed by a TS reproduction block 15.

Referring to FIG. 3, there is shown a diagram describing the extraction of slots from a frame that is executed by the TS reproduction block 15 shown in FIG. 1.

As described above, the TS reproduction block 15 extracts, as slots subject to extraction, slots in which the data of a desired program is included from the frame supplied from the FEC block 14.

In FIG. 3, of the 48 slots making up one frame, predetermined 24 slots include the data (encoded data) of a desired program and these slots are extracted.

Figure 4:
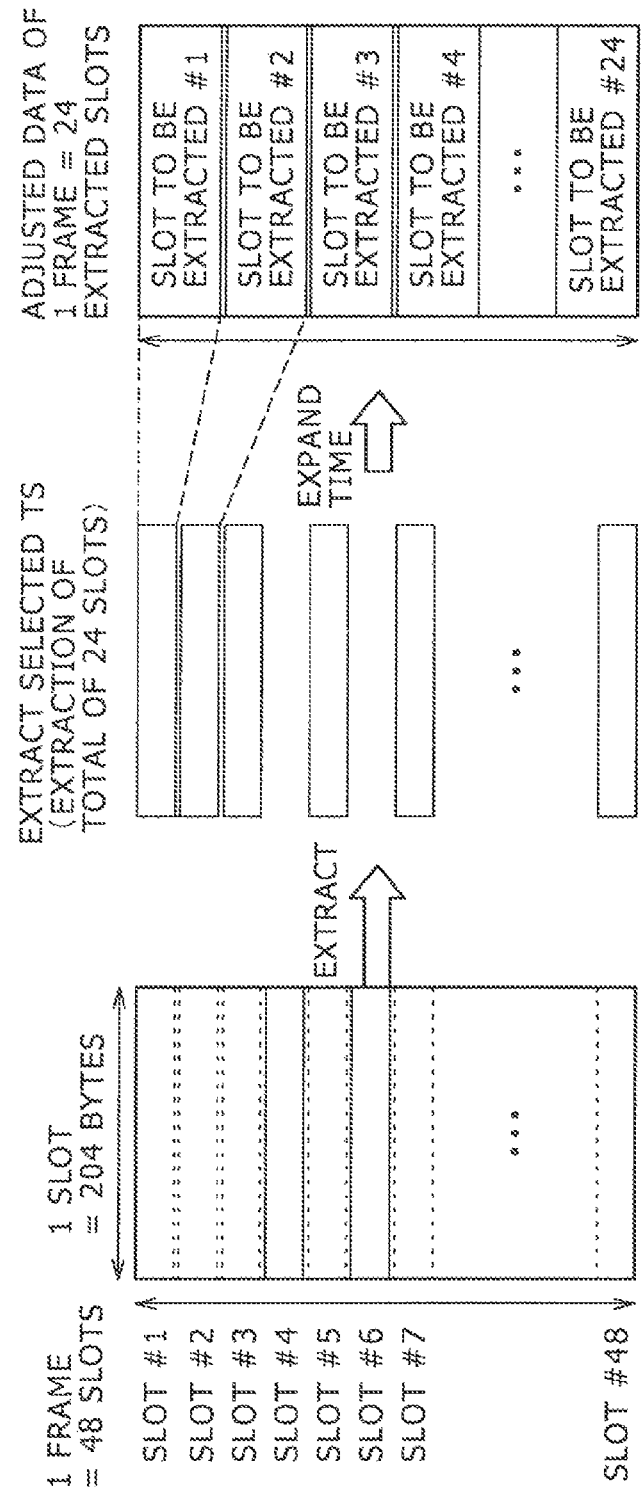
FIG. 4 is a diagram describing the adjustment of the rate of a slot to be executed by the TS reproduction block 15.

Referring to FIG. 4, there is shown a diagram describing the adjustment of slot rates that is executed by the TS reproduction block 15 shown in FIG. 1.

The TS reproduction block 15 outputs the slots extracted from the frame while executing rate adjustment on these slots (and supplies the slots to the decoder 16).

To be more specific, with a time of one frame as a unit time, the TS reproduction block 15 outputs the slots extracted from one frame within the unit time. The expansion of a slot time (or axis) is executed for the adjustment of slot rate.

In FIG. 4, with predetermined 24 slots of the 48 slots making up one frame as slots subject to extraction #1 through #24, these slots subject to extraction #1 through #24 are extracted and time-axis expanded into the data within the unit time.

Meanwhile, in the current BS, the selection of slots to be extracted among the slots making up each frame can be executed as desired.

To be more specific, in the current BS, the data of a program can be included in any number of slots at any locations, of the 48 slots making up one frame in the transmission apparatus.

In addition, in the current BS, the slots in which the data of a program is included can be changed every 16 frames.

Therefore, not only in the case where the user change channels in which programs are viewed, but also in the case where the user continues viewing the program of a particular channel (namely, a particular channel remains unchanged), it is sometimes necessary to track the slots subject to extraction that have been changed in the TS reproduction block 15.

Figure 5:
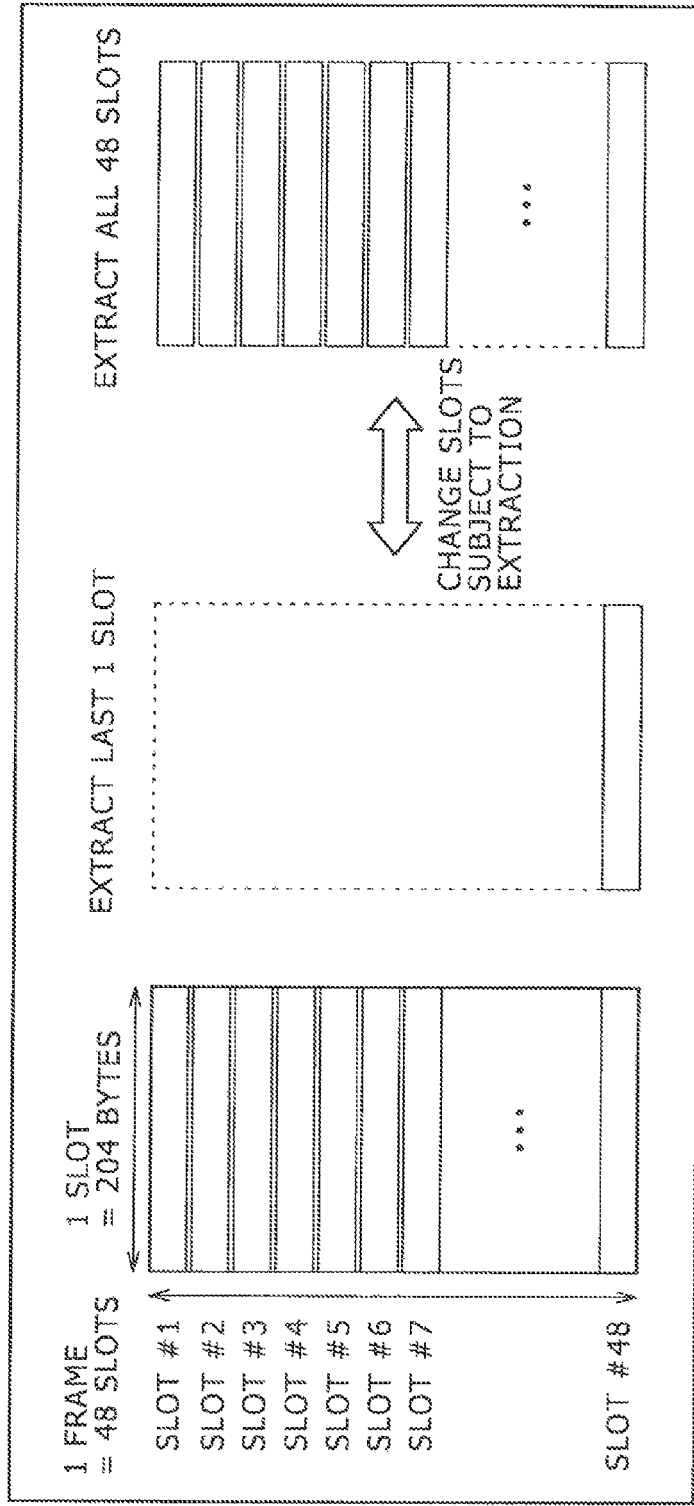
FIG. 5 is a diagram describing the changing of slots to be extracted.

Referring to FIG. 5, there is shown a diagram describing the changing of slots subject to extraction.

In FIG. 5, the slots subject to extraction have been changed from the last one slot #48 of the 48 slots making up one frame to all slots #1 through #48 making up one frame. Alternatively, in FIG. 5, the slots subject to extraction are changed from all slots #1 through #48 of the 48 slots making up one frame to the last one slot #48 of the 48 slots making up one frame.

Figure 6:
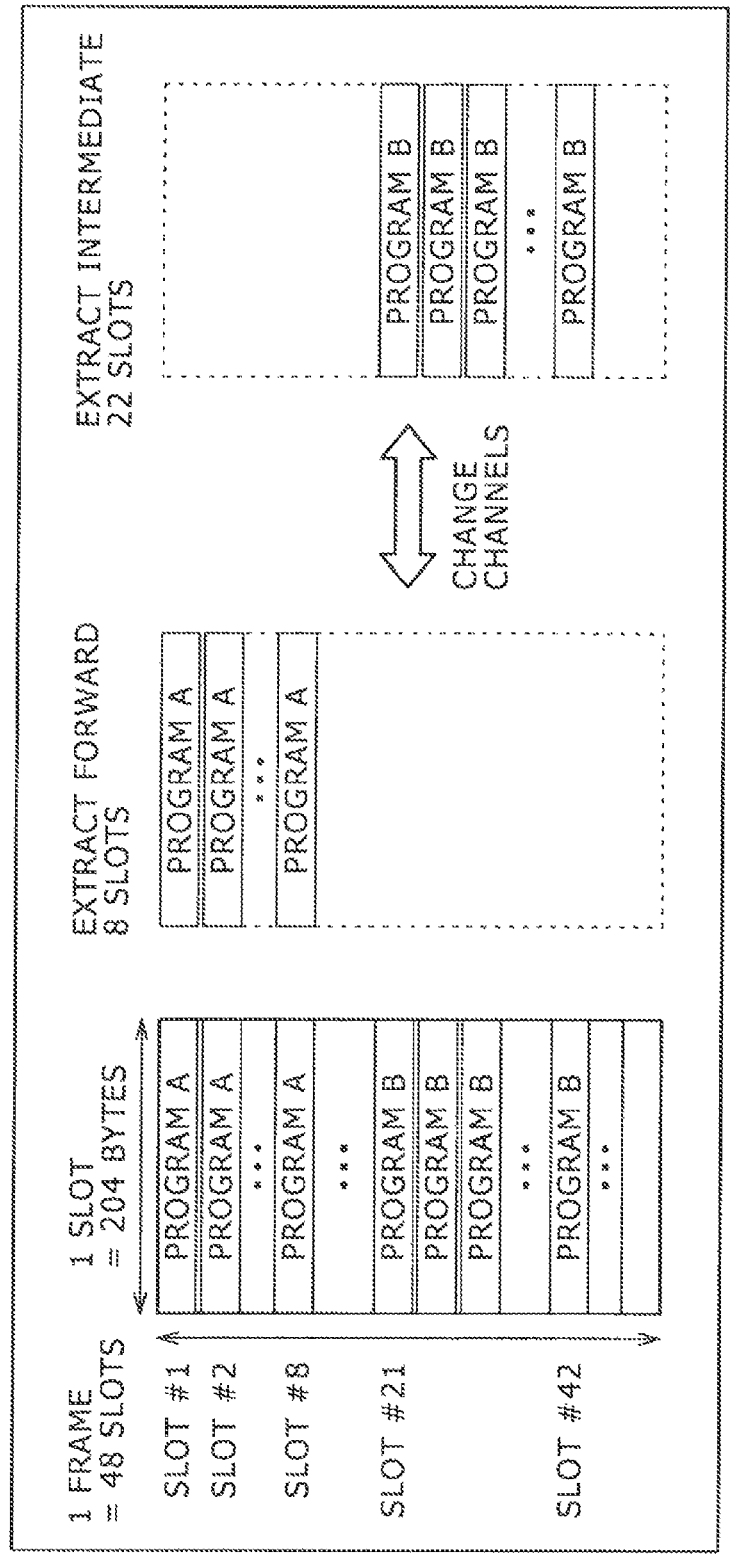
FIG. 6 is a diagram describing the changing of slots to be extracted in the TS reproduction block 15.

Referring to FIG. 6, there is shown a diagram describing the case where slots subject to extraction are changed in the TS reproduction block 15 because of the changing of channels to be viewed by the user.

In FIG. 6, of the 48 slots making up one frame, #1 through #48, 8 slots #1 through #8 include the data of program A of particular channel Ch#A and 22 slots #21 through #42 include data of program B of another channel Ch#B.

If channel Ch#A is selected in the reception apparatus (FIG. 1), the TS reproduction block 15 (FIG. 1) extracts 8 slots #1 through #8 in which data of program A of channel Ch#A is included as the slots subject to extraction.

If the user executes an operation (a channel operation) of channel change from channel Ch#A to channel Ch#B, the slots subject to extraction are changed from 8 slots #1 through #8 to 22 slots #21 through #42 in which the data of program B of channel Ch#B is included in the TS reproduction block 15.

It should be noted that channel Ch#B is selected in advance in the reception apparatus. Then, if the user executes a channel operation for channel change from channel Ch#B to channel Ch#A, the slots subject to extraction are changed from 22 slots #21 through #42 in which the data of program B of channel Ch#B is included to 8 slots #1 through #8 in which the data of program A of channel Ch#A is included in the TS reproduction block 15.

To be more specific, in this case, the TS reproduction block 15 extracts slots #21 through #42 from one frame before the channel operation and extracts slots #1 through #8 from one frame after the channel operation.

Here, in FIG. 6, both the slot locations and the number of slots that are the slots subject to extraction have been changed.

Figure 7:
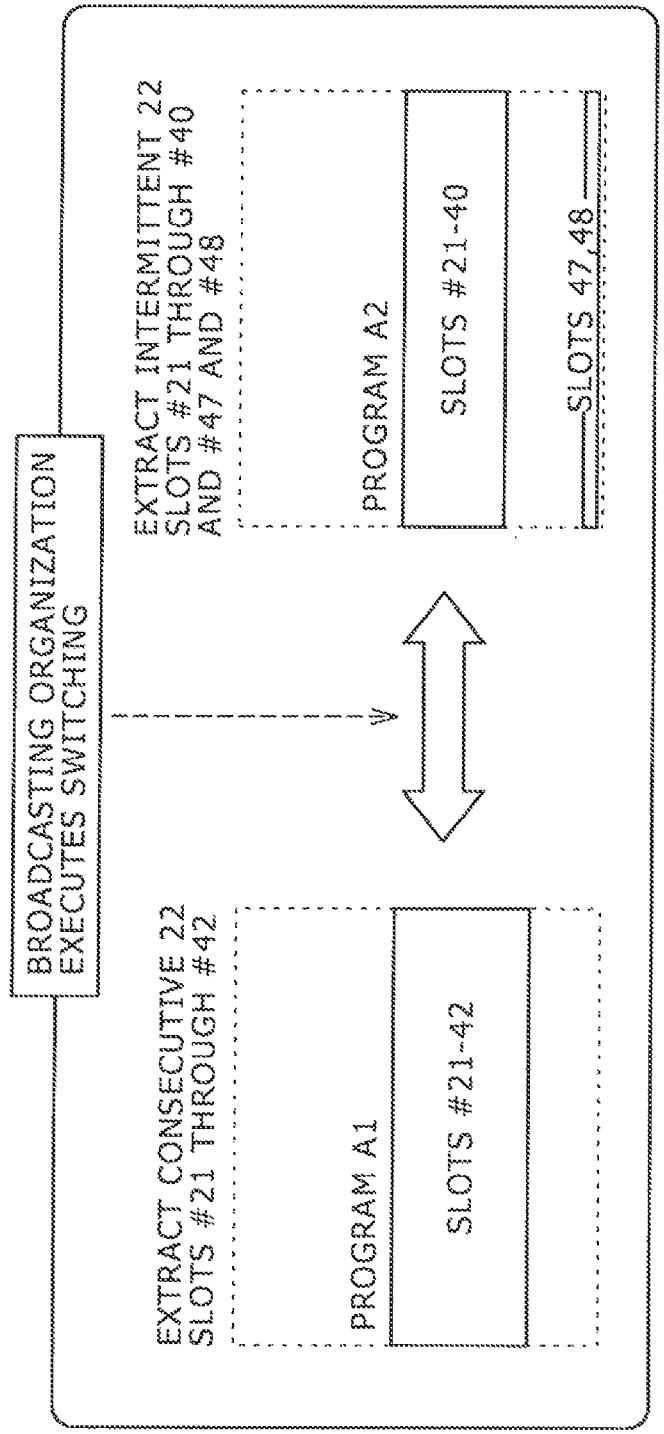
FIG. 7 is another diagram describing the changing of slots to be extracted in the TS reproduction block 15.

Referring to FIG. 7, there is shown a diagram describing the case where slots subject to extraction are changed in the TS reproduction block 15 because of the change of slots in which the data of program A of particular channel Ch#A in a transmission apparatus (or a broadcasting station) (a broadcasting organization).

In FIG. 7, the program data of program A1 to be broadcast in particular time zone TD1 in channel Ch#A is included in 22 slots #21 through #42 of 48 slots #1 through #48 making up one frame and data of program A2 to be broadcast in a next time zone TD2 in channel Ch#A is included in 22 slots #21 through #40 and #47 and #48.

In the reception apparatus (FIG. 1), if channel Ch#A is selected in time zone TD1, then the TS reproduction block 15 (FIG. 1) extracts, as the slots subject to extraction, the 22 slots #21 through #42 in which the data of program A1 of channel Ch#A is included from one frame.

Next, in the reception apparatus, when the next time zone TD2 is reached with the selection of channel Ch#A continued, then, in the TS reproduction block 15, the slots subject to extraction are changed from the 22 slots #21 through #42 to the 22 slots #21 through #40 and #47 and #48 in which the data of program A2 of channel Ch#A is included.

Here, in FIG. 7, only the locations have changed of the locations and the number of slots of the slots subject to extraction.

It should be noted that, in FIG. 7, slots #21 through #40 and slots #47 and #48 in which the data of program A2 is included include the data of image and so on having the same contents, but slots #21 through #40 are different in modulation scheme and so on from slots #47 and #48. Thus, a scheme of transmitting the data of image and so on having the same contents by different modulation schemes and so on is referred to as hierarchical transmission (or layered modulation).

Figure 8:
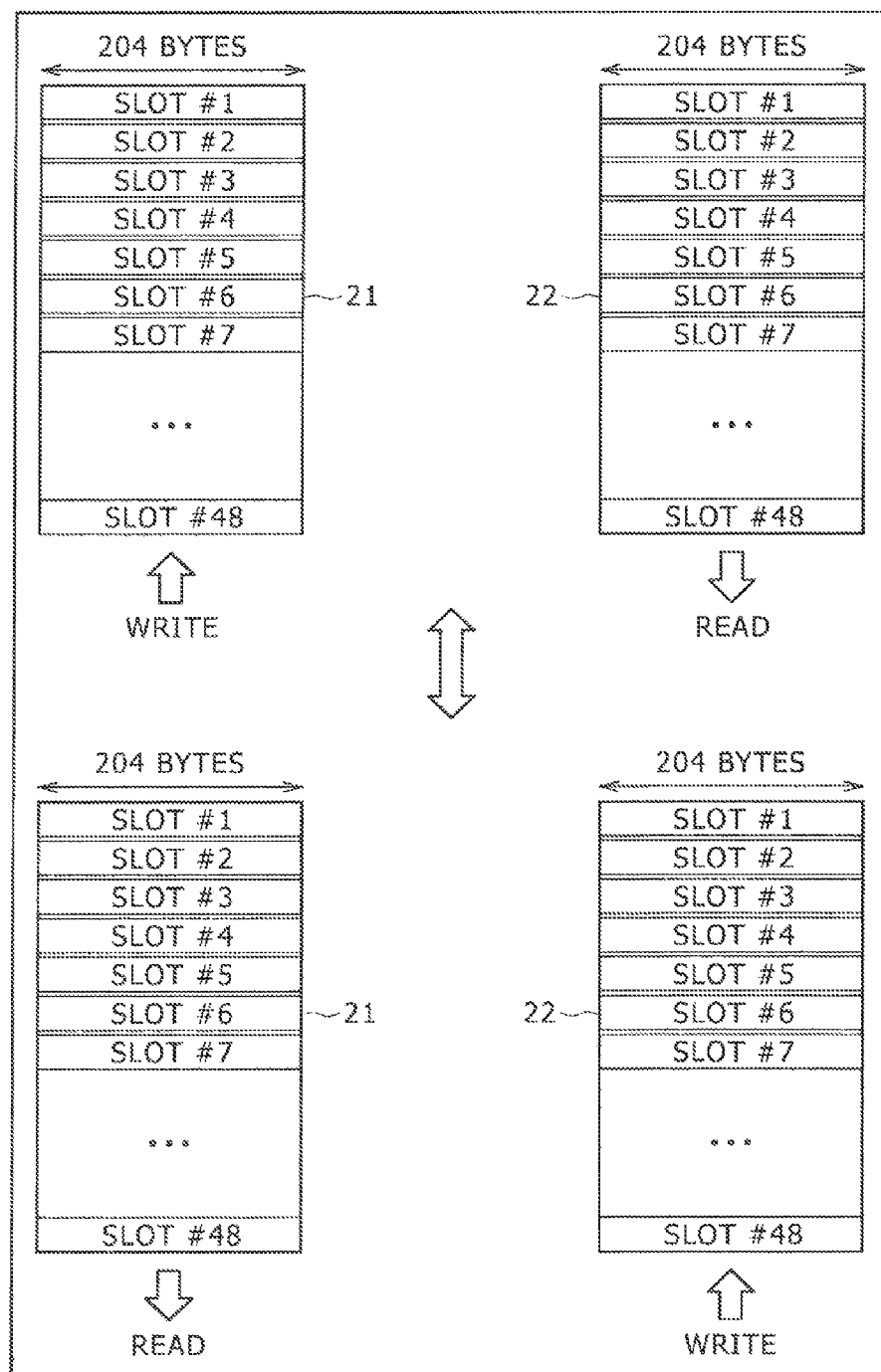
FIG. 8 is a diagram illustrating an exemplary configuration of the TS reproduction block 15.

Referring to FIG. 8, there is shown a diagram illustrating an exemplary configuration of the TS reproduction block 15 shown in FIG. 1.

The TS reproduction block 15 is configured by two frame buffers 21 and 22 each having a storage capacity equivalent to one frame.

In the TS reproduction block 15, the slots subject to extraction are extracted from the frame supplied from the FEC block 14 and the extracted slots are written to one of the frame buffer 21 and the frame buffer 22, to the frame buffer 21 for example.

When the slot subject to extraction are being written to the frame buffer 21, the slots subject to extraction extracted from the immediately preceding one frame and written to the frame buffer 22 are read from the frame buffer 22 with the rate being adjusted (time axis expansion).

Then, when a next frame is supplied from the FEC block 14 to the TS reproduction block 15, the slots subject to extraction are extracted in the TS reproduction block 15 from the frame supplied from the FEC block 14 and the extracted slots are written to the other of the frame buffer 21 and the frame buffer 22, to the frame buffer 22 in this example.

Next, while the slots subject to extraction are being written to the frame buffer 22, the slots subject to extraction extracted from the immediately preceding one frame and written to the frame buffer 22 are read from the frame buffer 22 with the rate being adjusted.

In what follows, in the TS reproduction block 15, every time a frame is supplied from the FEC block 14, the slots subject to extraction are written to the frame buffer 21, the slots subject to extraction are read from the frame buffer 22, the slots subject, to extraction are read from the frame buffer 21, and the slots subject to extraction are written to the frame buffer 22 in an alternate manner, thus executing read/Write operations on the slots subject to extraction by bank switching, so to speak.

As described above, the TS reproduction block 15 is configured by the two frame buffers 21 and 22 and, by use of the two frame buffers 21 and 22, read/write operations are executed on the slots subject to extraction in a bank switching manner, thereby supplying the slots subject to extraction extracted from a frame from the TS reproduction block 15 to a decoder 16 (FIG. 1) as the rate-adjusted data seamlessly, regardless of how the slots subject to extraction have been changed.

Here, the frame buffer 21, one of the pair of frame buffers 21 and 22 configuring the TS reproduction block 15, is also referred to as a bank #1 and the other frame buffer 22, a bank #2.

Figure 9:
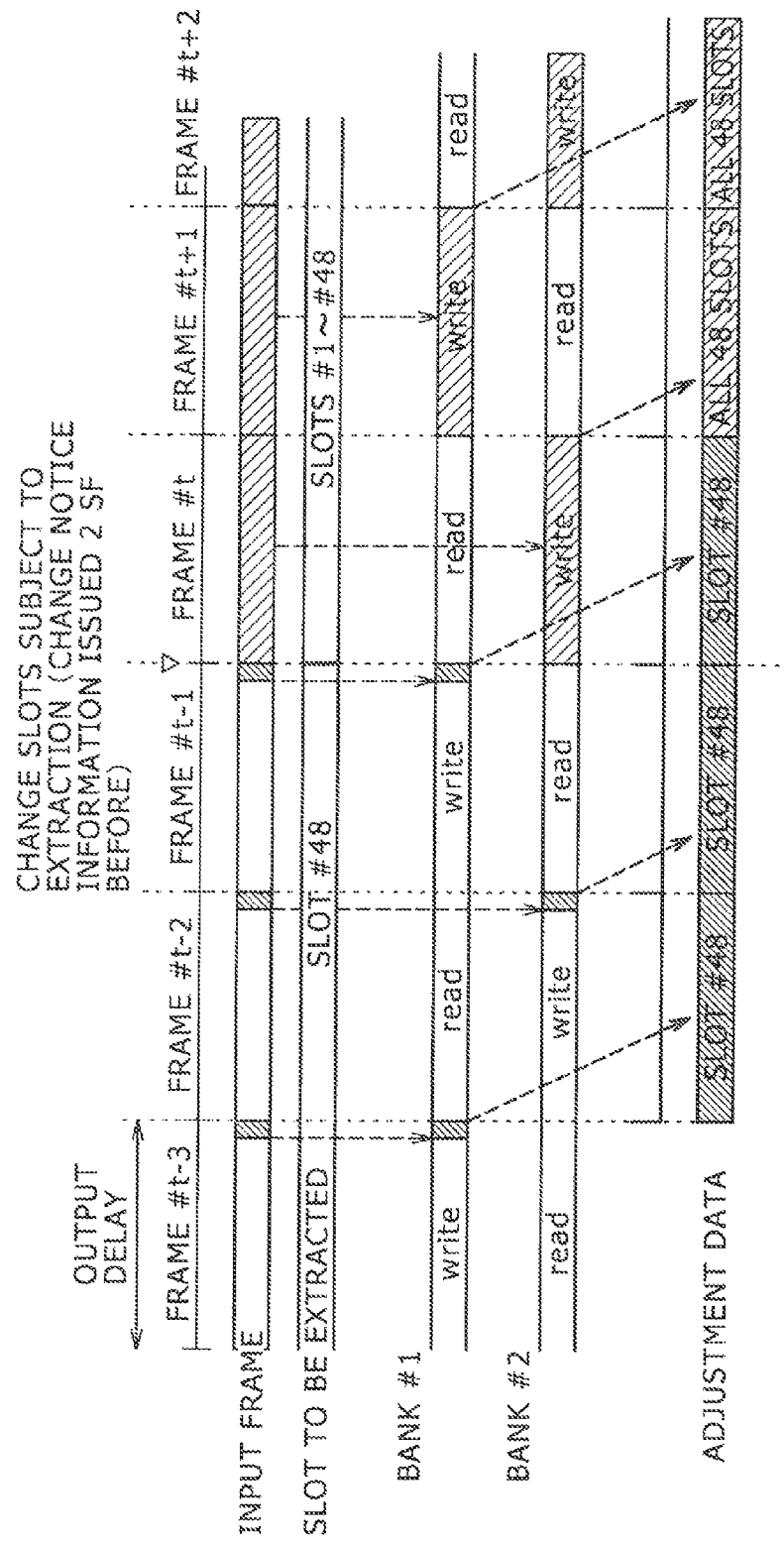
FIG. 9 is a timing chart indicative of an operation of the TS reproduction block 15 when slots subject to extraction are changed.

Referring to FIG. 9, there is shown a timing chart indicative of an operation of the TS reproduction block 15 to be executed when slots subject to extraction are changed.

From the transmission apparatus based on the current BS, change notice information for telling the change of slots in which the data of a program is included is transmitted as included in TMCC information two super frames (SF) before the timing of this change. By receiving this change notice information, the TS reproduction block 15 of the reception apparatus can recognize that the slots in which the program data is included are changed. It should be noted that one super frame is configured by eight frames for example in the current BS.

In FIG. 9, the slots in which program data is included are changed in frame #t.

To be more specific, in FIG. 9, for the frames up to frame #t−1, the last slot #48 of the 48 slots #1 through #48 making up one frame is the slot in which the program data is included and, for the frames subsequent to frame #t, all 48 slots #1 through #48 making up one frame are the slots in which the program data is included.

In this case, for example, for the frame #t−3, the TS reproduction block 15 extracts the slot #48 in which the program data is included from frame (input frame) #t−3 as the slot subject to extraction and writes the extracted slot to the bank #1 (the frame buffer 21 (FIG. 8)) of the pair of banks #1 and #2.

Slot #48 of the frame #t−3 written to the bank #1 is read therefrom during the next frame #t−2, thereby executing rate adjustment and being outputted as the adjusted data (supplied to the decoder 16 (FIG. 1)).

For the next frame #t−2, the TS reproduction block 15 extracts slot #48 in which the program data is included from the frame #t−2 as a slot subject to extraction and writes the extracted slot to the bank #2 (the frame buffer 22 (FIG. 8)) of the pair of banks #1 and #2.

The slot #48 of the frame #t−2 written to the bank #2 is read from the bank #2 during the next frame #t−1 to be rate-adjusted and the rate-adjusted slot is outputted as adjusted data.

The next frame #t−1 is processed in the same manner as the frames #t−3 and #t−2.

To be more specific, for the frame #t−1, the TS reproduction block 15 extracts the slot #48 in which the program data is included from the frame #t−1 as a slot subject to extraction and writes the extracted slot to the bank #1.

The slot #48 of the frame #t−1 written to the bank #1 is read from the bank #1 during the next frame #t to be rate-adjusted and outputted as the adjusted data.

For the subsequent frame #t, the TS reproduction block 15 changes the slots subject to extraction from the slot #48 to all slots #1 through #48 in which the program data is included and executes the same processing as described above.

To be more specific, for the frame #t, the TS reproduction block 15 extracts the slots #1 through #48 that are the slots subject to extraction from frame #t and writes the extracted slots to the bank #2.

The slots #1 through #48 of the frame #t written to the bank #2 are read therefrom during the next frame #t+1 to be rate-adjusted and outputted as the adjusted data.

For the next frame #t+1, the TS reproduction block 15 extracts the slots #1 through #48 that are the slots subject to extraction from the frame #t+1 and writes the extracted slots to the bank #1.

The slots #1 through #48 of the frame #t+1 written to the bank #1 are read therefrom during the next frame #t+2 to be rate-adjusted and outputted as the adjusted data.

For the frames #t+2 and on, the same processing as described above is executed.

As described above with reference to FIG. 8, the TS reproduction block 15 has the two frame buffers 21 and 22 (banks #1 and #2) each having the capacity for one frame and reads/writes the slots subject to extraction by bank switching, thereby supplying the rate-adjusted data of the slots subject to extraction extracted from the frame from the TS reproduction block 15 to the decoder 16 (FIG. 1) as the adjusted data seamlessly regardless of how the slots subject to extraction have been changed.

It should be noted that, as described above with reference to FIG. 2, in the current BS, one frame is 78336 bits=48 slots× 204 bytes×8 bits, so that the two frame buffers 21 and 22 require a memory capacity of about 0.15 Mb (≈78336 bits×2).

[Description of the Advanced BS]

Figure 10:
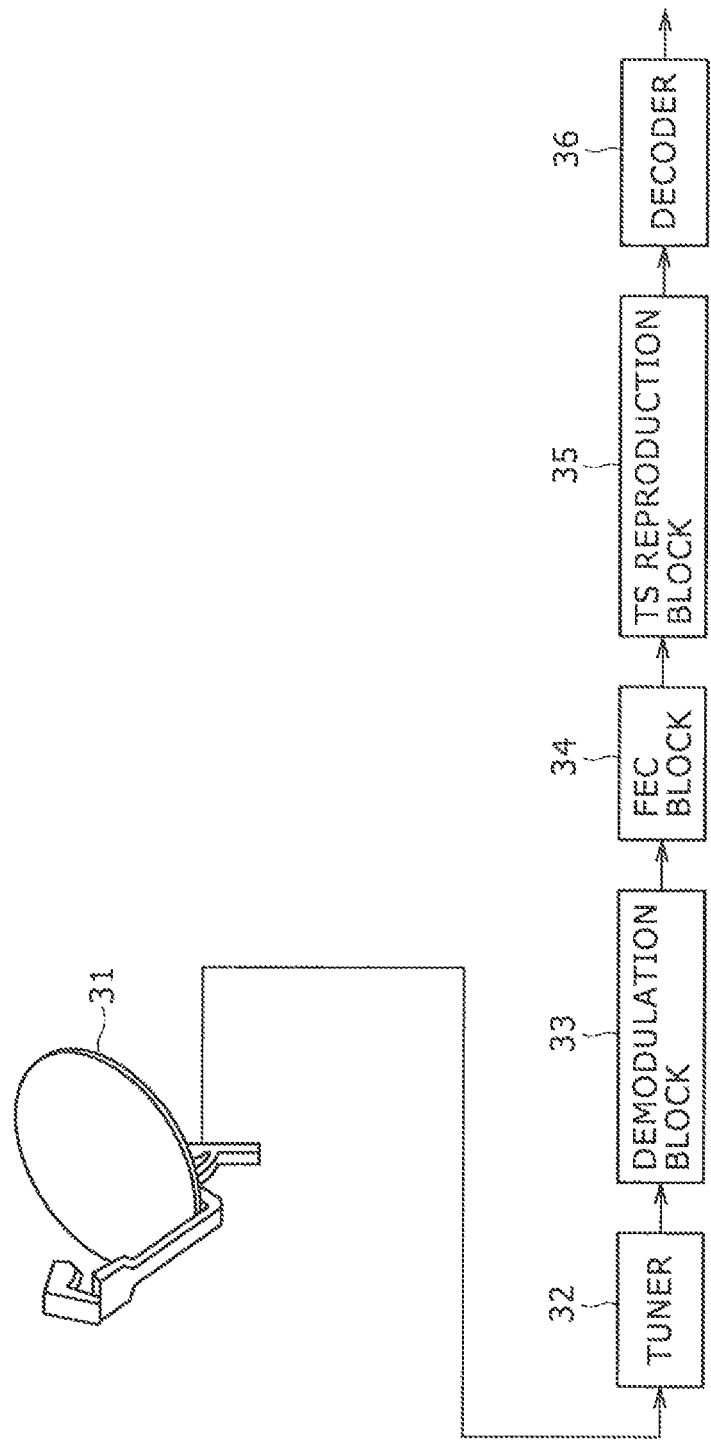
FIG. 10 is a block diagram illustrating an exemplary configuration of a reception apparatus based on the advanced BS practiced as one embodiment of the invention.

Referring to FIG. 10, there is shown a block diagram illustrating an exemplary configuration of a reception apparatus based on the advanced BS practiced as one embodiment of the invention.

From a transmission apparatus (not shown) based on the advanced BS, a modulation signal obtained by digital modulation is supplied.

An antenna 31 receives the modulation signal supplied from the transmission apparatus (via a BS not shown) and supplies the received modulation signal to a tuner 32.

The tuner 32 extracts (or detects) a modulation signal of a predetermined frequency band and supplies the extracted modulation signal to the demodulation block 33.

The demodulation block 33 demodulates the modulation signal supplied from the tuner 32 and supplies a demodulation signal obtained as a result of the demodulation to the FEC block 34.

The FEC block 34 executes error correction processing on the demodulation signal supplied from the demodulation block 33 (or decodes an error correction code included in the demodulation signal) and supplies a frame made up of two or more slots obtained as a result of the error correction processing to a TS reproduction block 35.

In the frame, the TS reproduction block 35 extracts slots subject to extraction in which the data of a desired program is included as the subject to extraction from the frame supplied from the FEC block 34 and supplies the extracted slots subject to extraction to a decoder 36 with the rate being adjusted.

The decoder 36 MPEG-decodes the encoded data in a TS packet included in the slots (the slot subject to extraction) supplied from the TS reproduction block 35 and outputs image and audio data obtained as a result of the decoding.

Figure 11:
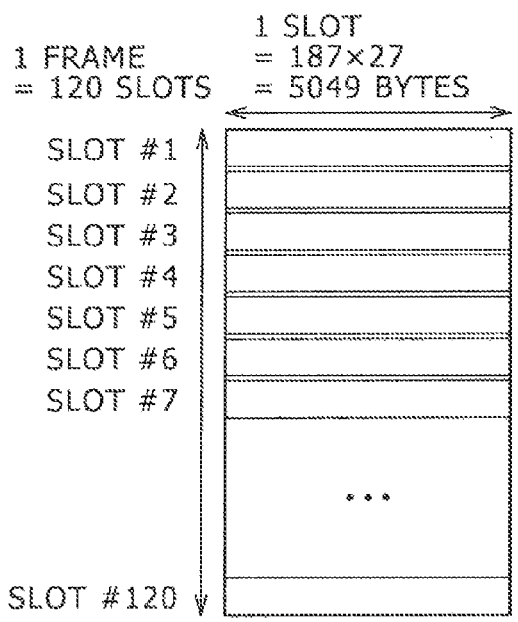
FIG. 11 is a diagram indicative of a frame of the advanced BS.

Referring to FIG. 11, there is shown a diagram indicative of a frame (a frame based on the advanced BS) that is supplied from the FEC block 34 shown in FIG. 10 to the TS reproduction block 35.

One frame based on the advanced BS is made up of a maximum of 120 slots as described before.

One slot (the size thereof) based on the advanced BS is a maximum of 187 bytes×27; therefore, one frame (the size thereof) made up of 120 slots is about 4 Mb≈4847040 bits=120 slots×187 bytes×27×8 bits.

It should be noted that, like the slot based on the current BS, the slot based on the advanced BS includes a TS packet that includes encoded data obtained by MPEG-encoding image data and so on.

Figure 12:
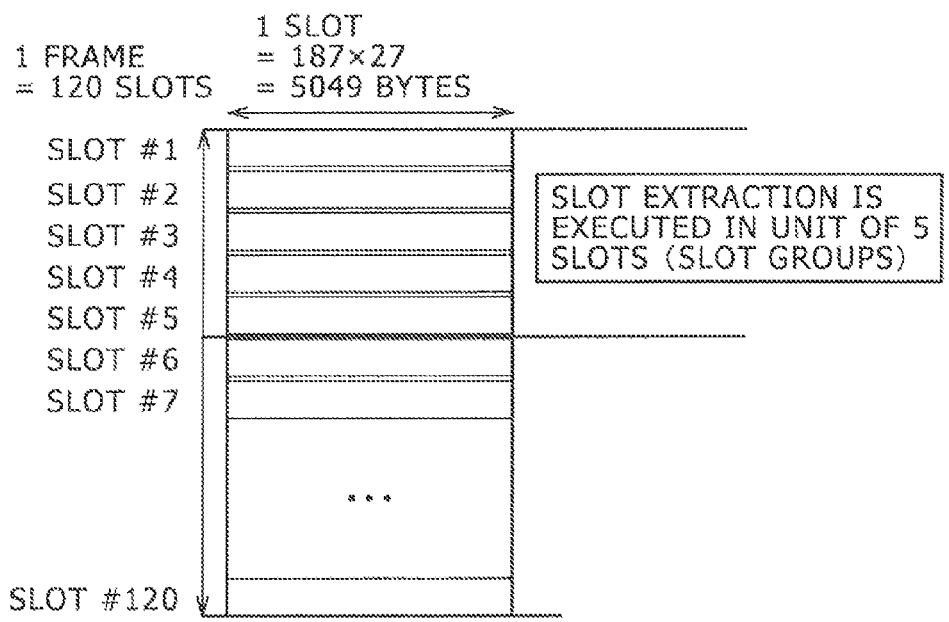
FIG. 12 is a diagram describing the extraction of slots from a frame to be executed by the TS reproduction block 35.

Referring to FIG. 12, there is shown a diagram describing the extraction of slots (slots subject to extraction) from a frame executed by the TS reproduction block 35 shown in FIG. 10.

As described above, The TS reproduction block 35 extracts, as slots subject to extraction, the slots in which data of a desired program is included from a frame supplied from the FEC block 34.

In the advanced BS, the program data (including dummy data) is included in slots that are a multiple of 5 in number thereof, in unit of five slots.

Consequently, in the TS reproduction block 35, the extraction of slots (slots subject to extraction) from a frame is executed in unit of five slots.

The five slots providing unit in which slots are extracted from a frame is referred to as a slot group.

Because one frame based on the advance BS is made up of 120 slots, one frame based on the advanced BS has 24 (=120 slots/5 slots) slot groups. Of these 24 slot groups, the TS reproduction block 35 extracts slots (or slot groups) with the slots of one or more slot groups being the slots subject to extraction.

Figure 13:
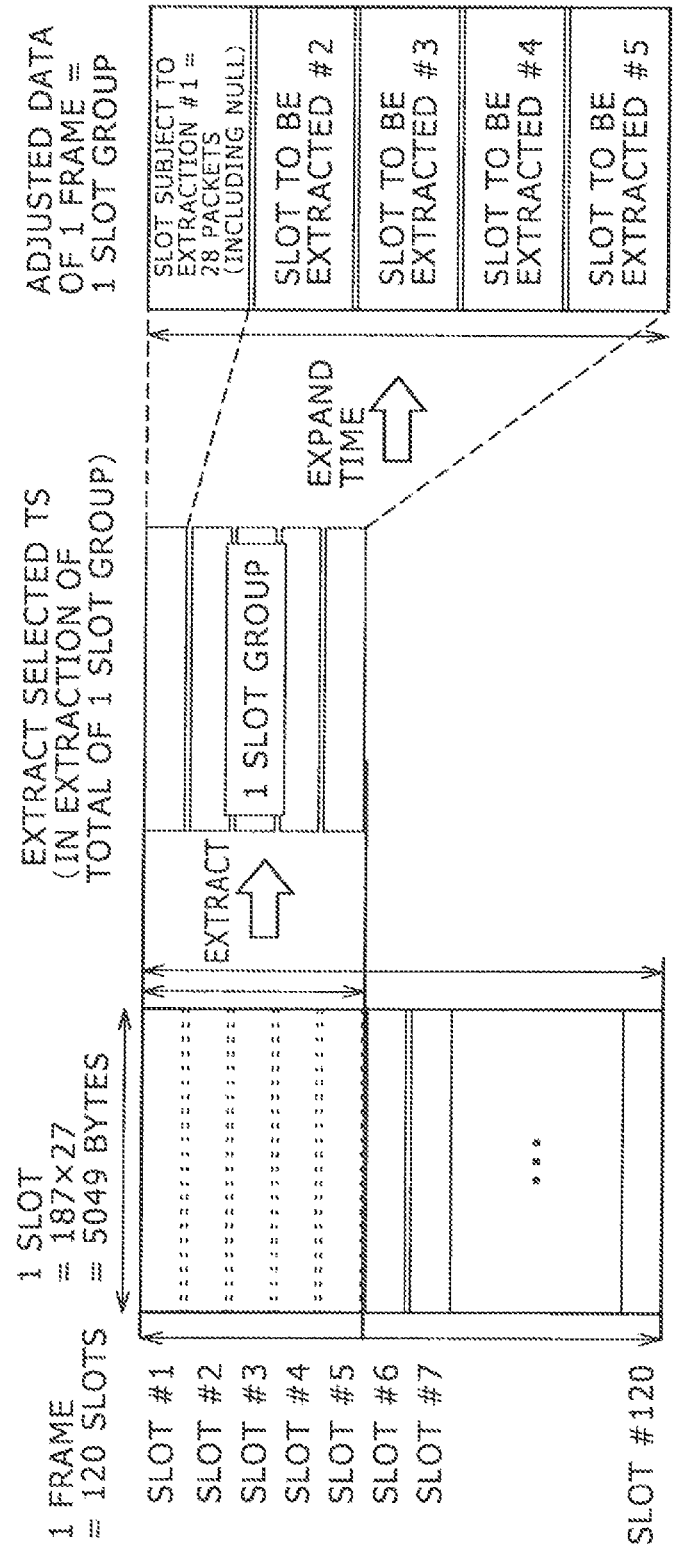
FIG. 13 is a diagram describing the adjustment of the rate of slot to be executed by the TS reproduction block 35.

Referring to FIG. 13, there is shown a diagram describing the adjustment of slot rates to be executed by the TS reproduction block 35 shown in FIG. 10.

The TS reproduction block 35 outputs the slots (the slots subject to extraction) extracted from a frame with the rate being adjusted (and supplies the adjusted slots to the decoder 36).

To be more specific, the TS reproduction block 35 executes, as slot rate adjustment, slot time axis expansion in which, with the time of one frame used as a unit time, the slots subject to extraction extracted from one frame are outputted within the unit time.

In FIG. 13, of the 120 slots making up one frame, five slots making up one slot group are extracted as slots subject to extraction #1 through #5 and these five slots subject to extraction #1 through #5 are time-axis expanded into the data in the unit time.

It should be noted that, in the advanced BS, which of the slots making up a frame are to be slots subject to extraction is selected as desired as long as the unit in which five slots makes up one slot group.

To be more specific, in the advanced BS, in the transmission apparatus, of the 24 slot groups making up one frame, the program data can be included in any number of slot groups at any locations.

Like the current BS described before, the slots subject to extraction must sometimes be changed, in the advanced BS, in the TS reproduction block 35, because of a channel operation or the change of slots (or slot groups) in which the program data is included in the transmission apparatus.

For the method in which the rate of the slots extracted from a frame (or the slots subject to extraction) is adjusted and the adjusted slots are outputted seamlessly as the adjusted data obtained as a result of the adjustment in the TS reproduction block 35, a method is available in which the TS reproduction block 35 is made up of two frame buffers each have the storage capacity for one frame and the slots subject to extraction are read or written by bank switching as with the TS reproduction block 15 (FIG. 1) described with reference to FIG. 8.

[The First Exemplary Configuration of the TS Reproduction Block 35]

Figure 14:
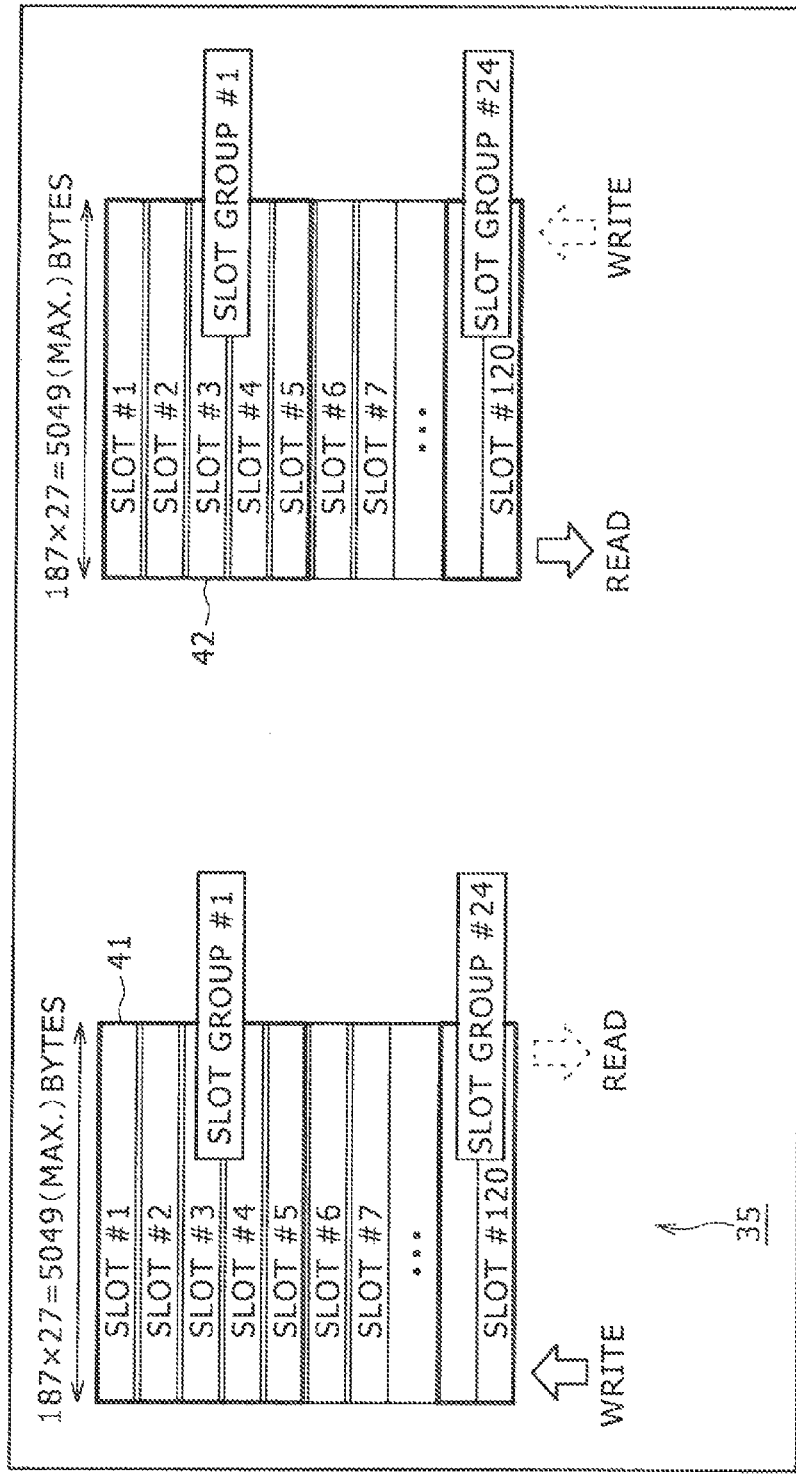
FIG. 14 is a block diagram illustrating a first exemplary configuration of the TS reproduction block 35.

Referring to FIG. 14, there is shown a block diagram illustrating an exemplary configuration (the first exemplary configuration) of the TS reproduction block 35 mentioned above.

In FIG. 14, the TS reproduction block 35 is made up of two frame buffers 41 and 42 each having a storage capacity for one frame.

In the TS reproduction block 35, slots in the slot group, unit are extracted as the slots subject to extraction from a frame (an input frame) supplied from the FEC block 34 and the extracted slots are written to one of the frame buffers 41 and 42, in this example, to the frame buffer 41.

Next, when the slots subject to extraction are written to the frame buffer 41, the slots subject to extraction extracted from the immediately preceding frame are read from the frame buffer 42 with the rate being adjusted (time-axis expanded).

Then, when the next frame is supplied from the FEC block 34 (FIG. 10) to the TS reproduction block 35, slots subject to extraction are extracted from the frame supplied from the FEC block 34 to be written to the other of the pair of frame buffer 41 and the frame buffer 42, in this example, to the frame buffer 42.

Next, while the slots subject to extraction are being written to the frame buffer 42, the slots subject to extraction extracted from the immediately preceding frame and written to the frame buffer 42 are read with the rate being adjusted.

In what follows, in the TS reproduction block 35, every time a frame is supplied from the FEC block 34, the slots subject to extraction are written to the frame buffer 41, the slots subject to extraction are read from the frame buffer 42, the slots subject to extraction are read from the frame buffer 41, and the slots subject to extraction are written to the frame buffer 42 in an alternate manner, thus executing read/write operations on the slots subject to extraction by bank switching, so to speak.

As described above, the TS reproduction block 35 is configured by the two frame buffers 41 and 42 and, by use of the two frame buffers 41 and 42, read/write operations are, executed on the slots subject to extraction in a bank switching manner, thereby supplying the slots (the slots subject to extraction) extracted from the frame to the decoder 36 (FIG. 10) seamlessly as the rate-adjusted data from the TS reproduction block 35 regardless of how the slots subject to extraction in slot group unit have been changed.

[The Second Exemplary Configuration of the TS Reproduction Block 35]

Meanwhile, in the advanced BS, one frame is 4847040 bits=120 slots×187 bytes×27×8 bits as described with reference to FIG. 11.

Therefore, the two frame buffers 41 and 42 require a huge memory size of about 9.6 Mb (≈4847040 bits×2) as compared with the current BS (about 0.15 Mb), thereby leading to an increased scale and an increased cost of the reception apparatus (FIG. 10).

Figure 15:
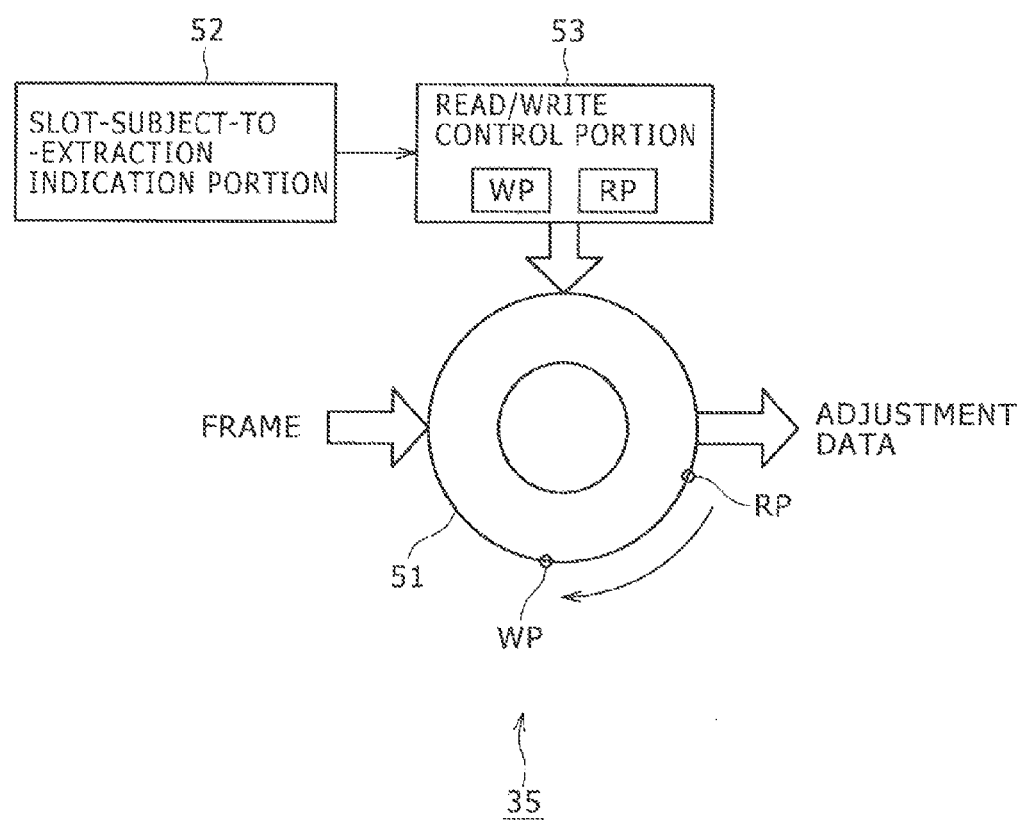
FIG. 15 is a block diagram illustrating a second exemplary configuration of the TS reproduction block 35.

Hence, referring to FIG. 15, there is shown a block diagram illustrating a second exemplary configuration of the TS reproduction block 35 shown in FIG. 10.

In FIG. 15, the TS reproduction block 35 has a ring buffer 51, a slot-subject-to-extraction indication portion 52, and a read/write control portion 53.

Figure 19:
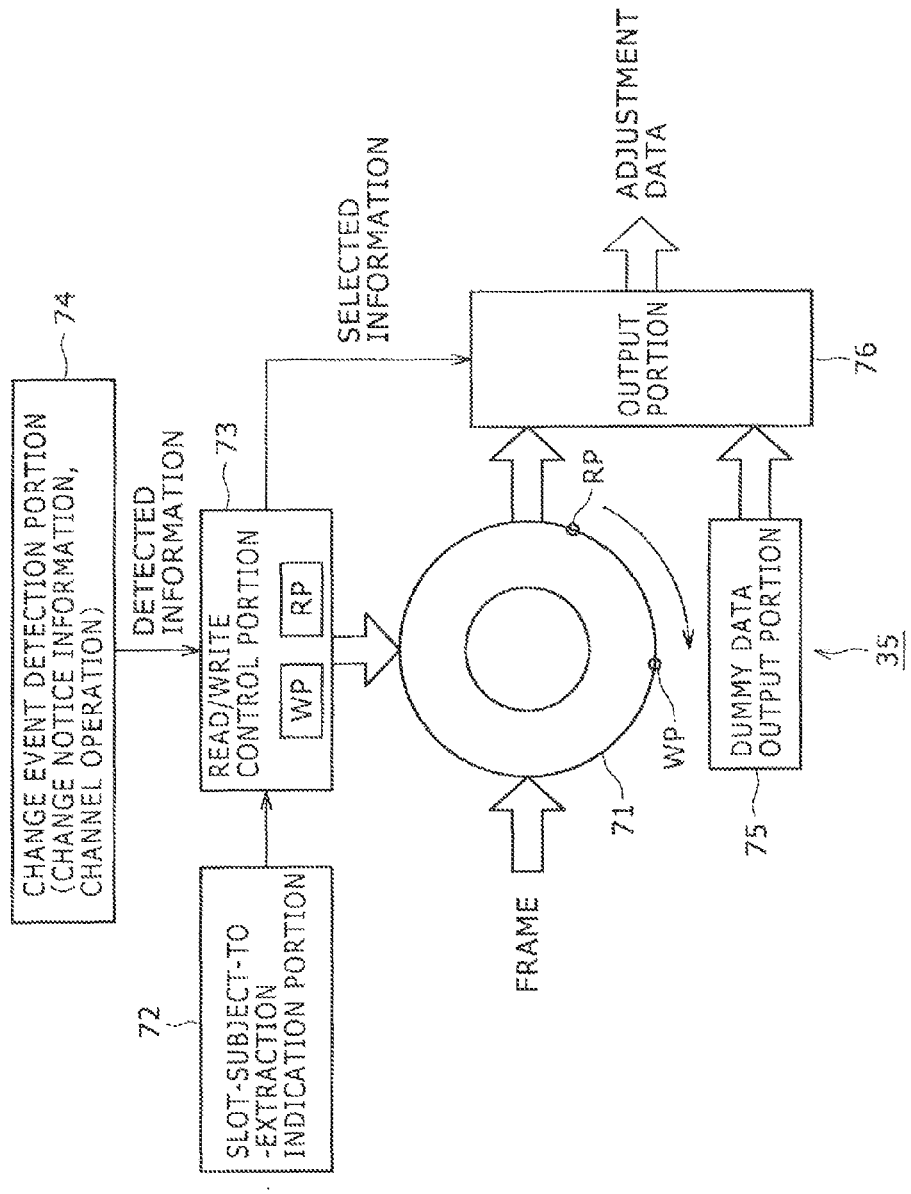
FIG. 19 is a block diagram illustrating a third exemplary configuration of the TS reproduction block 35.

The ring buffer 51 is supplied with a frame (an input frame) form the FEC block 34 (FIG. 19).

Under the control of the read/write control portion 53, the ring buffer 51 writes (or stores) a slot subject to extraction of the slots in the frame supplied from the TS reproduction block 35 to a write point WP (Write Point) that is a write address.

Further, under the control of the read/write control portion 53, the ring buffer 51 reads a slot (a slot subject to extraction) from a read point RP (Read Point) that is a read address and supplies the read slot to the decoder 36 (FIG. 10) as adjusted data.

In the frame, the slot-subject-to-extraction indication portion 52 supplies indication information indicative of the slot subject to extraction (or the slot specified to be a slot subject to extraction) to the read/write control portion 53.

On the basis of the indication information supplied from the slot-subject-to-extraction indication portion 52, the read/write control portion 53 recognizes the slot subject to extraction.

In addition, the read/write control portion 53 executes read/write control of writing the slot subject to extraction (or the slot specified to be a slot subject to extraction) of the slots included in one frame supplied from the FEC block 34 to the ring buffer 51 by controlling the write point WP (by this writing by the control of write point WP, the slot subject to extraction is extracted from the frame) and reading the slot subject to extraction extracted from one frame from the ring buffer 51 within the time of one frame that is a preset unit time by controlling the read point RP.

In the TS reproduction block 35 configured as described above, the read/write control portion 53 recognizes the slot subject to extraction on the basis of the indication information supplied from the slot-subject-to-extraction indication portion 52.

Next, the read/write control portion 53 executes read/write control on the ring buffer 51 such that the write point WP and the read point RP are controlled to execute read/write on the slot subject to extraction of the slots in one frame supplied from the FEC block 34.

Under the read/write control of the read/write control portion 53, the ring buffer 51 writes the slot subject to extraction (or the slot specified to be a slot subject to extraction) of the slots in one frame supplied from the FEC block 34 to the write point WP (or storage area specified by the WP) of the ring buffer 51 and reads the slot subject to extraction extracted from one frame from the read point RP (or a storage area specified by the RP) of the ring buffer 51, thereby outputting the adjusted data obtained by adjusting the rate of the slot subject to extraction.

Figure 16:
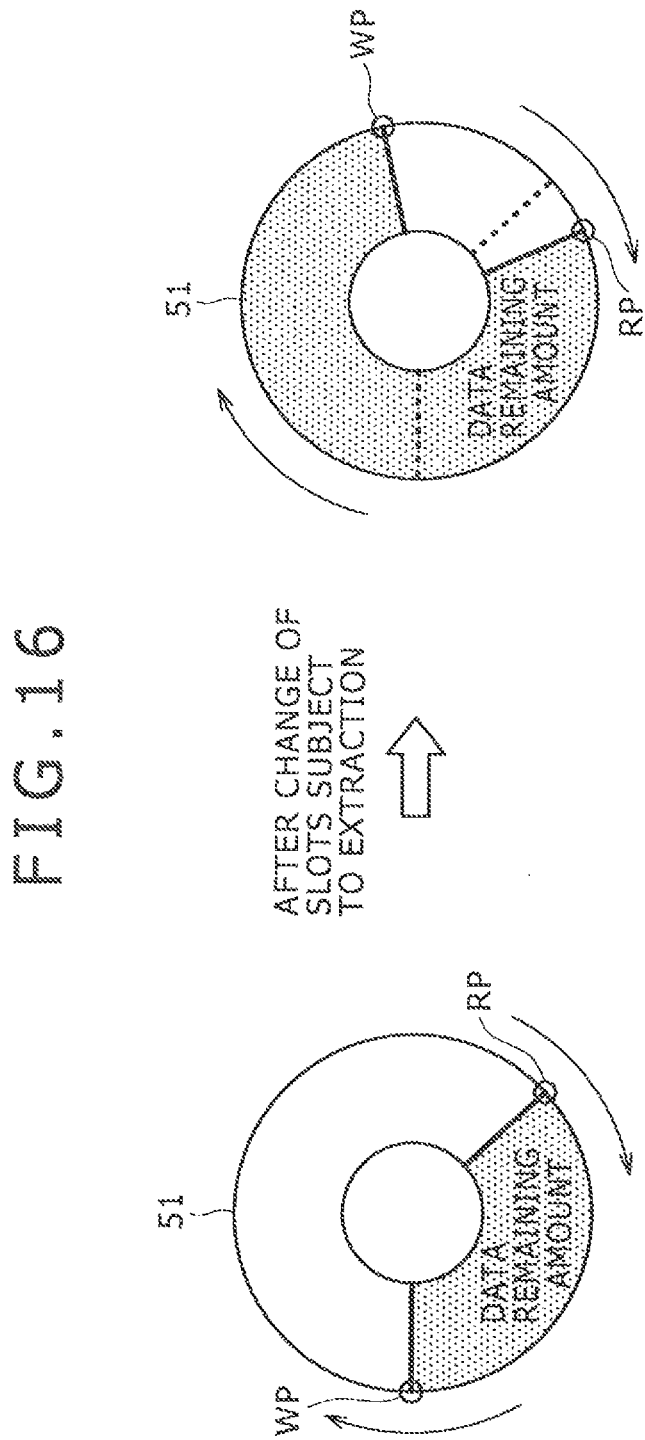
FIG. 16 is a diagram describing the reading and writing of a slot from and to a ring buffer 51.

Referring to FIG. 16, there is shown a diagram describing a slot read/write operation to be executed on the ring buffer 51 shown in FIG. 15.

To be more specific, FIG. 16 schematically shows the ring buffer 51 shown in FIG. 15.

In FIG. 16, the address space of the ring buffer 51 is expressed by a circle and the write point WP and the read point RP moves clockwise on the circumference of this circle that is the address space.

When the write point WP outruns the read point RP, it denotes an overflow; inversely, when the read point RP outruns the write point WP, it denotes an underflow.

It should be noted that the data in a range from the read point RP to the write point WP clockwise provides the data not yet read from the ring buffer 51 and the data mount of this data is referred to as a remaining data amount.

As shown in FIG. 16, the remaining data amount of the ring buffer 51 may rapidly increase immediately after the change of slots subject to extraction; therefore, for the capacity of the ring buffer 51, a capacity in which no overflow is caused even if the remaining data amount rapidly increases must be prepared.

It should be noted that the quick increase of the remaining data amount of the ring buffer 51 is caused most when the slots subject to extraction are changed from the slots of the last slot group #24 of the 24 slot groups #1 through #24 making up one frame to the slots of all 24 slot groups #1 through #24.

To be more specific, a frame is supplied to the ring buffer 51 from the FEC block 34 (FIG. 10) at a predetermined rate and only the slots subject to extraction in this frame of the predetermined rate are written to the ring buffer 51.

This writing of the slots subject to extraction to the ring buffer 51 is executed at a constant write rate.

Therefore, the number of slots to be written to the ring buffer 51 during one frame is maximized in the advanced BS when the 24 slot groups making up one frame, namely, all of 120 slots, are the slots subject to extraction.

On the other hand, from the ring buffer 51, the slot subject to extraction extracted from one frame and written thereinto is read during the time of one frame and outputted as adjusted data.

Therefore, the reading of the slot subject to extraction from the ring buffer 51 is executed with the rate in proportion to the number of slots subject to extraction extracted from one frame used as a read rate.

Consequently, the read rate is minimized (namely, the slowest read rate) when the number of slots subject to extraction in one frame is the smallest.

Here, in the advanced BS, the slots in slot group unit becomes slots subject to extraction, so that the number of slots subject to extraction becomes the smallest when the number of slots subject to extraction is five that makes up one slot group.

As described above, the number of slots to be written to the ring buffer 51 is maximized when all of the 24 slot groups (the 120 slots thereof) making up one frame are the slots subject to extraction and the read rate of the ring buffer 51 is minimized when the slots subject to extraction are of one slot group (five slots thereof) (if the slots subject to extraction is of the minimum one slot group, the reading of data from the ring buffer 51 is executed in accordance with a slowest clock).

Therefore, the remaining data amount of the ring buffer 51 most increases in the case where, while one slot group extracted from a frame in which the slots subject to extraction are of one slot group is being read from the ring buffer 51, the 24 slot groups extracted from the frame in which all of 24 slot groups making up one frame are the slots subject to extraction are written to the ring buffer 51.

To be more specific, the remaining data amount of the ring buffer 51 most increases when the slots subject to extraction are changed from one slot group (five slots thereof) to all of 24 slot groups (120 slots thereof).

It should be noted that, in the ring buffer 51, if the reading of slots written to the ring buffer 51 is started as early as possible, then the remaining data amount of the ring buffer 51 most increases when the slots subject to extraction are changed from the last one slot group #24 of the 24 slot groups of one frame to all of 24 slot groups #1 through #24.

To be more specific, when, between frame #t-1 and frame #t, the slots subject to extraction are changed from the last one slot group #24 of the 24 slot groups #1 through #24 of one frame to all of 24 slot groups #1 through #24, the reading of the slot group #24 extracted from the frame #t-1 from the ring buffer 51 ends immediately before the writing of the slot groups #1 through #24 extracted from frame #t ends, so that the reading of the slot groups #1 through #24 from the ring buffer 51 cannot be started.

As described above, if the slots subject to extraction are changed between frame #t-1 and frame #t from the last one slot group #24 of the 24 slot groups #1 through #24 of one frame to all of the 24 slot groups #1 through #24, the timing with which the slot groups #1 through #24 extracted from frame #t and written to the ring buffer 15 can be read is the slowest and the number of slot groups to be written to the ring buffer 15 until the reading of the slot groups #1 through #24 is started is maximized, so that the remaining data amount of the ring buffer 51 becomes the greatest.

Figure 17:
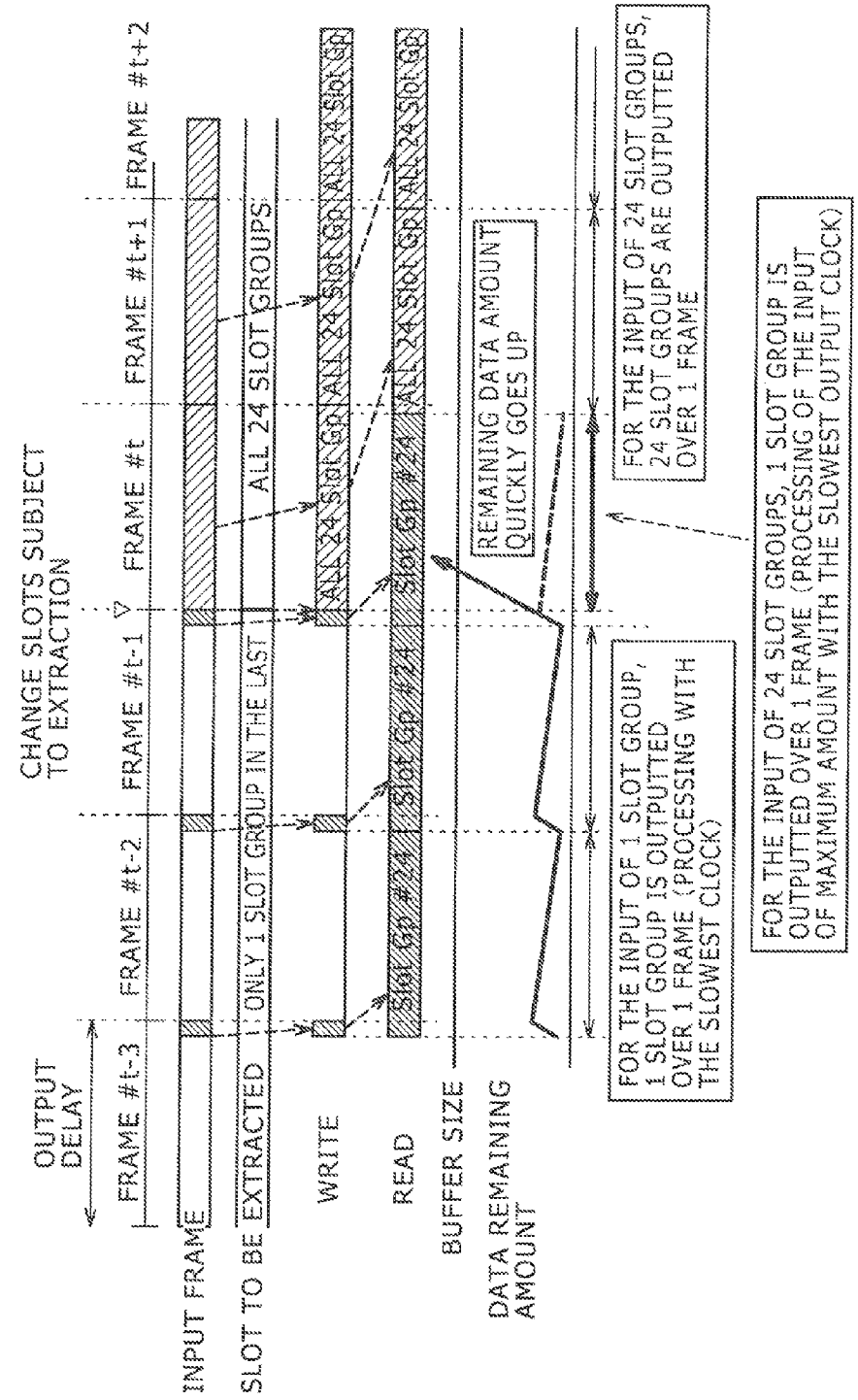
FIG. 17 is a timing chart for describing an operation of the TS reproduction block 35 when slots subject to extraction are changed.

Referring to FIG. 17, there is shown a timing chart indicative of an operation of the TS reproduction block 35 shown in FIG. 15 when the slots subject to extraction are changed.

Here, for example, from the transmission apparatus based on the advanced BS, change notice information telling the change of slots in which program data is included is transmitted as included in TMCC information two frames ahead from the timing of the change. Receiving this change notice information, the TS reproduction block 35 of the reception apparatus (FIG. 10) can recognize that the slots in which program data is included are changed.

In FIG. 17, the slots in which program data is included are changed in frame #t so as to most increase the remaining data amount of the ring buffer 51.

To be more specific, in FIG. 17, for the frames up to frame #t-1, the last slot group #24 (the five slots thereof) of the 24 slot groups #1 through #24 making up one frame is the slots in which program data is included; for the frames subsequent to frame #t, all of the 24 slot groups #1 through #24 making up one frame are the slots in which program data is included.

In this case, for example, for frame #t-3, the TS reproduction block 35 extracts the last slot group #24 (the five slots thereof) from frame #-3 as the slots subject to extraction and writes the extracted slot group to the ring buffer 51.

For the slot group #24 of the frame #t-3 written to the ring buffer 51, the reading from the ring buffer 51 is started immediately after this writing. The reading of the slot group (Slot Gp) #24 of the frame #t-3 written to the ring buffer 51 is executed during time of one frame, by which the adjusted data with the rate adjusted is outputted.

For the next frame #t-2 and the next frame #t-1 thereto, the same processing as the frame #t-3 is executed.

To be more specific, for the frame #t-2, the TS reproduction block 35 extracts the last slot group #24 that is the slots subject to extraction from the frame #t-2 and writes the extracted slot group to the ring buffer 51.

When the writing of the last one slot group #24 of the frame #t-2 to the ring buffer 51 is started, the reading of the slot group #24 of the immediately preceding frame #t-3 from the ring buffer 51 has been ended by taking the time of one frame.

For this reason, for the slot group #24 of the frame #t-2 written to the ring buffer 51, the reading from the ring buffer 51 is started immediately after this writing. The reading of the slop group #24 of the frame #t-2 written to the ring buffer 51 is executed during time of one frame, by which the adjusted data with the rate adjusted is outputted.

For the frame #t-1, the TS reproduction block 35 extracts the last slot group #24 that is the slots subject to extraction from the frame #t-1 and writes the extracted slot group to the ring buffer 51.

When the writing of the last one slot group #24 of the frame #t-1 to the ring buffer 51 is started, the reading of the slot group #24 of the immediately preceding frame #t-2 from the ring buffer 51 has been ended by taking the time of one frame.

For this reason, for the slot group #24 of the frame #t-1 written to the ring buffer 51, the reading from the ring buffer 51 is started immediately after the start of this writing. The reading of the slot group #24 of the frame #t-1 written to the ring buffer 51 is executed during the time of one frame, by which the adjusted data with the rate adjusted is outputted.

For the subsequent frame #t, the TS reproduction block 35 changes the slots subject to extraction from one slot group #24 to all of the 24 slot groups #1 through #24, thereby executing the same processing as described above.

To be more specific, for the frame #t, the TS reproduction block 35 extracts slot groups #1 through #24 that is the slots subject to extraction from the frame #t and writes the extracted slot groups to the ring buffer 51.

When the writing of the slot groups #1 through #24 of the frame #t to the ring buffer 51 is started, the reading of the slot group #24 of the immediately preceding frame #t-1 from the ring buffer 51 by taking the time of one frame has just started.

Next, the reading of the slot groups #1 through #24 of the frame #t written to the ring buffer 51 from the ring buffer 51 is not started until the reading of the slot group #24 of the immediately preceding frame #t from the ring buffer 51 ends.

The reading of the slot group #24 of the immediately preceding frame #t−1 from the ring buffer 51 by taking the time of one frame ends in the time of one frame after the start of the writing of the slot group #24 of the frame #t−1 to the ring buffer 51 (and the reading therefrom).

When the reading of the slot group #24 of the immediately preceding frame #t−1 from the ring buffer 51 is ended, reading of the slot groups #1 through #24 of the frame #t written to the ring buffer 51 from the ring buffer 51 is started. The reading of the slot groups #1 through #24 of the frame #t written to the ring buffer 51 is executed during the time of one frame, by which the adjusted data with the rate adjusted is outputted.

As described above, while one slot group #24 of the immediately preceding frame #t−1 is being read from the ring buffer 51 by taking the time of one frame, the 24 slot groups #1 through #24 of the frame #t are written to the ring buffer 51, but the reading of these slot groups from the ring buffer 51 is not started.

Consequently, the remaining data amount of the ring buffer 51 rapidly increases as shown in FIG. 17.

For the subsequent frame #t+1, the TS reproduction block 35 extracts the slot groups #1 through #24 that are the slots subject to extraction from the frame #t+1 and writes the extracted slot groups to the ring buffer 51.

When the writing of the slot groups #1 through #24 of the frame #t+1 to the ring buffer 51 is started, the reading of the slot groups #1 through #24 of the immediately preceding frame #t from the frame memory 51 by taking the time of one frame has just started.

The reading of the slot groups #1 through #24 of the frame #t+1 written to the ring buffer 51 from the ring buffer 51 is not started until the reading of the slot groups #1 through #24 of the immediately preceding frame #t from the ring buffer 51 is ended.

When the reading of the slot groups #1 through #24 of the immediately preceding frame #t from the ring buffer 51 is ended, the reading of the slot groups #1 through #24 of the frame #t+1 written to the ring buffer 51 from the ring buffer 51 is started. The reading of the slot groups #1 through #24 of the frame #t written to the ring buffer 51 is executed during the time of one frame, by which the adjusted data with the rate adjusted is outputted.

As described above, when the writing of the slot groups #1 through #24 of the frame #t+1 to the ring buffer 51 is started, the reading of the slot groups #1 through #24 of the immediately preceding frame #t from the frame memory 51 by taking the time of one frame has just started. Hence, immediately after the writing of the slot groups #1 through #24 of the frame #t+1 to the ring buffer 51 is started, the reading of the slot groups #1 through #24 of this frame #t+1 from the ring buffer 51 cannot be started.

However, because the slots subject to extraction of the frame #t and frame #t+1 are all of the slot groups #1 through #24 making up one frame, the rate of writing of slot groups #1 through #24 of the frame #t+1 to the ring buffer 51 is (almost) the same as the rate of reading the slot groups #1 through #24 of the immediately preceding frame #t from the ring buffer 51 by taking the time of one frame.

Therefore, after the start of writing of the slot groups #1 through #24 of the frame #t+1 to the ring buffer 51 and before, the reading of the slot groups #1 through #24 of the frame #t+1 from the ring buffer 51 is started, the rate of writing to the ring buffer 51 is the same as the rate of reading from the ring buffer 51, so that the remaining data amount of the ring buffer 51 does not increase.

For the frames #t+2 and on, the same processing as that of the frame #t+1 is executed.

As described above, the remaining data amount of the ring buffer 51 rapidly increases to be maximized at the time of writing of the slot groups #1 through #24 that are the slots subject to extraction of the frame #t in which the slots subject to extraction are changed from the last one slot group #24 to all of slot groups #1 through #24 of one frame.

Therefore, for the capacity of the ring buffer 51, a value higher than the maximum remaining data amount must be used in order to prevent an overflow from happening.

Figure 18:
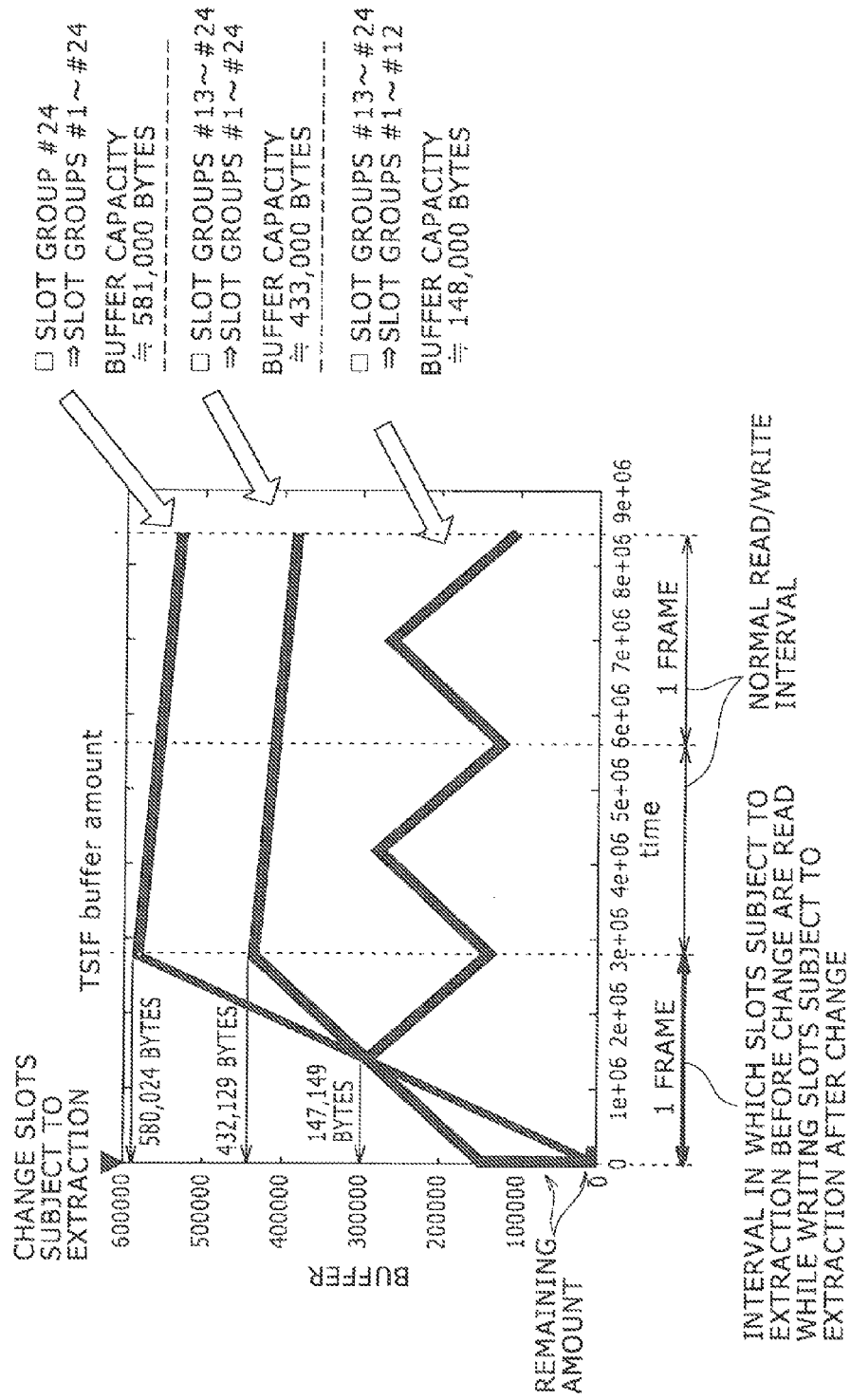
FIG. 18 is a diagram indicative of a simulation result of the data remaining amount of the ring buffer 51 when slots subject to extraction have been changed from the last one slot group #24 to all slot groups #1 through #24 in one frame.

Referring to FIG. 18, there is shown a diagram indicative of a simulation result of the remaining data amount of the ring buffer 51 when the slots subject to extraction have been changed from the last one slot group #24 to all of the slot groups #1 through #24 of one frame.

In FIG. 18, the horizontal axis represents the time with one pulse of the pulses of frequency 82 MHz being one time and the vertical axis represents remaining data amount in bytes.

FIG. 18 also shows simulation results for the purpose of reference of a remaining data amount resulted from the changing of the slots subject to extraction from the last 12 slot groups #13 through #24 of the slot groups #1 through #24 making up one frame to all of the 24 slot groups #1 through #24 and a remaining data amount resulted from the changing of the slots subject to extraction from the last 12 slot groups #13 through #24 to the first 12 slot groups #1 through #12.

According to the above-mentioned simulations, the maximum remaining data amount is 580024 bytes and, for the capacity of the ring buffer 51, a value of 581000 bytes for example higher than a value of 580024 bytes can be used.

As described above, use of the ring buffer 51 (FIG. 15) in the TS reproduction block 35 (FIG. 10) allows the ring buffer 51 to use a memory of about 4.6 Mb≈581000 bytes×8 bits.

Therefore, if the ring buffer 51 (FIG. 15) is used in the TS reproduction block 35 (FIG. 10), the increased scale and cost of the reception apparatus (FIG. 10) can be prevented (or lowered) as compared with the use of the frame buffer 41 and the frame buffer 42 (FIG. 14) which require a memory capacity of about 9.6 Mb.

[The Third Exemplary Configuration of the TS Reproduction Block 35]

As described above, use of the ring buffer 51 (FIG. 15) in the TS reproduction block 35 (FIG. 10) allows the use of a memory of about 4.6 Mb≈581000 bytes×8 bits for the ring buffer 51.

Meanwhile, in the advanced BS, one frame is 4847040 bits=120 slots×187 bytes×27×8 bits wide as described before with reference to FIG. 11.

Therefore, if the ring buffer 51 is used in the TS reproduction block 35, a memory of about one frame of the advanced BS is required for the ring buffer 51.

Hence, shown in FIG. 19 is a block diagram indicative of an exemplary configuration (or the third exemplary configuration) of the TS reproduction device shown in FIG. 10 that can use a memory of a smaller capacity.

In FIG. 15, a TS reproduction block 35 has a ring buffer 71, a slot-subject-to-extraction indication portion 72, a read/write control portion 73, a change event detection portion 74, a dummy data output portion 75, and an output portion 76.

The ring buffer 71 is supplied with a frame from the FEC block 34 (FIG. 19).

Under the control of the read/write control portion 73, the ring buffer 71 writes (or stores) a slot subject to extraction of the slots in the frame supplied from the TS reproduction block 35 to a write point WP that is a write address.

Further, under the control of the read/write control portion 73, the ring buffer 71 reads, during the time of one frame, the slots (the slots subject to extraction) extracted from one frame written to a read point RP that is a read address and supplies the read slots to the output portion 76.

In the frame, slot-subject-to-extraction indication portion 72 supplies the indication information for specifying the slots subject to extraction (or the slots specified to be slots subject to extraction) to the read/write control portion 73.

The read/write control portion 73 recognizes the slots subject to extraction on the basis of the indication information supplied from the slot-subject-to-extraction indication portion 72.

Next, the read/write control portion 73 executes read/write control of writing the slots subject to extraction (or the slots specified to be slots subject to extraction) of the slots of one frame supplied from the FEC block 34 to the ring buffer 71 by controlling the write point WP and reading the slots subject to extraction written to the ring buffer 71 by controlling the read point RP during the time of one frame that is a preset unit time.

The read/write control portion 73 is also supplied with detection information from the change event detection portion 74 indicative of the detection of change notice information and the detection of a channel operation done by the user.

When the detection information is supplied from the change event detection portion 74, the read/write control portion 73 supplies, in accordance with the supplied detection information, the selection information to the output portion 76 for specifying the selection of the slots subject to extraction read from the ring buffer 71 or the null packet outputted from the dummy data output portion 75.

The change event detection portion 74 detects change notice information or a channel operation that is an event (or a change event) telling a change of slots subject to extraction and, when the change notice information or the channel operation is detected, supplies the detection information indicative of the detection to the read/write control portion 73.

To be more specific, if the slots in which program data is included are changed, the transmission apparatus based on the advanced BS transmits the change notice information indicative of the change of the slots in which program data is included as included in TMCC information in the frame preceding by two frames that is the predetermined number of frames of the frame for executing this change.

Therefore, in a certain channel, for example, if the slots in which program data is included are changed at the time of switching between programs, the change notice information is transmitted from the transmission apparatus at the time two frames before the program switching.

The change event detection portion 74 detects the change notice information transmitted from the transmission apparatus as described above and, if the change notice information is detected, supplies the detection information indicative of this detection to the read/write control portion 73.

In addition, the change event detection portion 74 detects a channel operation on the reception apparatus (FIG. 10) done by the user and, if the channel operation is detected, supplies the detection information indicative of this detection to the read/write control portion 73.

The dummy data output portion 75 outputs an MPEG null packet for example as dummy data that is empty data. The null packet outputted from the dummy data output portion 75 is supplied to the output portion 76.

The null packet specified by MPEG is a packet in which the first 4 byes of a TS packet are 0x47, 0x1F, 0xFF, and 0x1F, the payload bits being all "1" for example.

In accordance with the selection information supplied from the read/write control portion 73, the output portion 76 executes output processing for selecting the slots (the slots subject to extraction) supplied from the ring buffer 71 or the null packet supplied from the dummy data output portion 75 and outputting the selected slots or null packet as the adjusted data (to the decoder 36 (FIG. 10)).

Here, the output portion 76 selects the slots supplied from the ring buffer 71 as default. Next, if the selection information is supplied from the read/write control portion 73, the output portion 76 executes, in accordance with the supplied selection information, the output processing for selecting the slots supplied from the ring buffer 71 or the null packet supplied from the dummy data output portion 75 and outputting the selected slots or null packet.

As described above, when the change notice information that is a change event indicative of the change of slots subject to extraction or the detection information indicative of the detection of a channel operation is supplied from the change event detection portion 74, the read/write control portion 73 supplies the selection information to the output portion 76 in accordance with the supplied detection information.

Therefore, the selection information is supplied from the read/write control portion 73 to the output portion 76 when slots subject to extraction have been changed; if this change of slots subject to extraction is executed, the output portion 76 executes the output processing based on the supplied selection information.

Then, in the output processing based on the supplied selection information, the output portion 76 selects the null packet outputted from the dummy data output portion 75 with the timing of the frame immediately before the change start frame that is the frame in which the change of slots subject to extraction is started and outputs the selected null packet as the adjusted data; for the frames subsequent to the change start frame, the output portion 76 selects the slots subject to extraction read from the ring buffer 71 and outputs the selected slots as the adjusted data.

It should be noted that, if a null packet is outputted as the adjusted data by the output portion 76, the image data and audio data outputted from the decoder 36 provide the data (hereafter referred to as blanking data) with which the screen is displayed patternlessly and monochromatically (black, blue or the like for example) and the audio output is soundless (or muted), for example.

Therefore, if a null packet is outputted as the adjusted data by the output portion 76, then the screen (or an image displayed thereon) is black for example and the sound is in a muted state (hereafter referred to also as a blanking state), for example.

Figure 20:
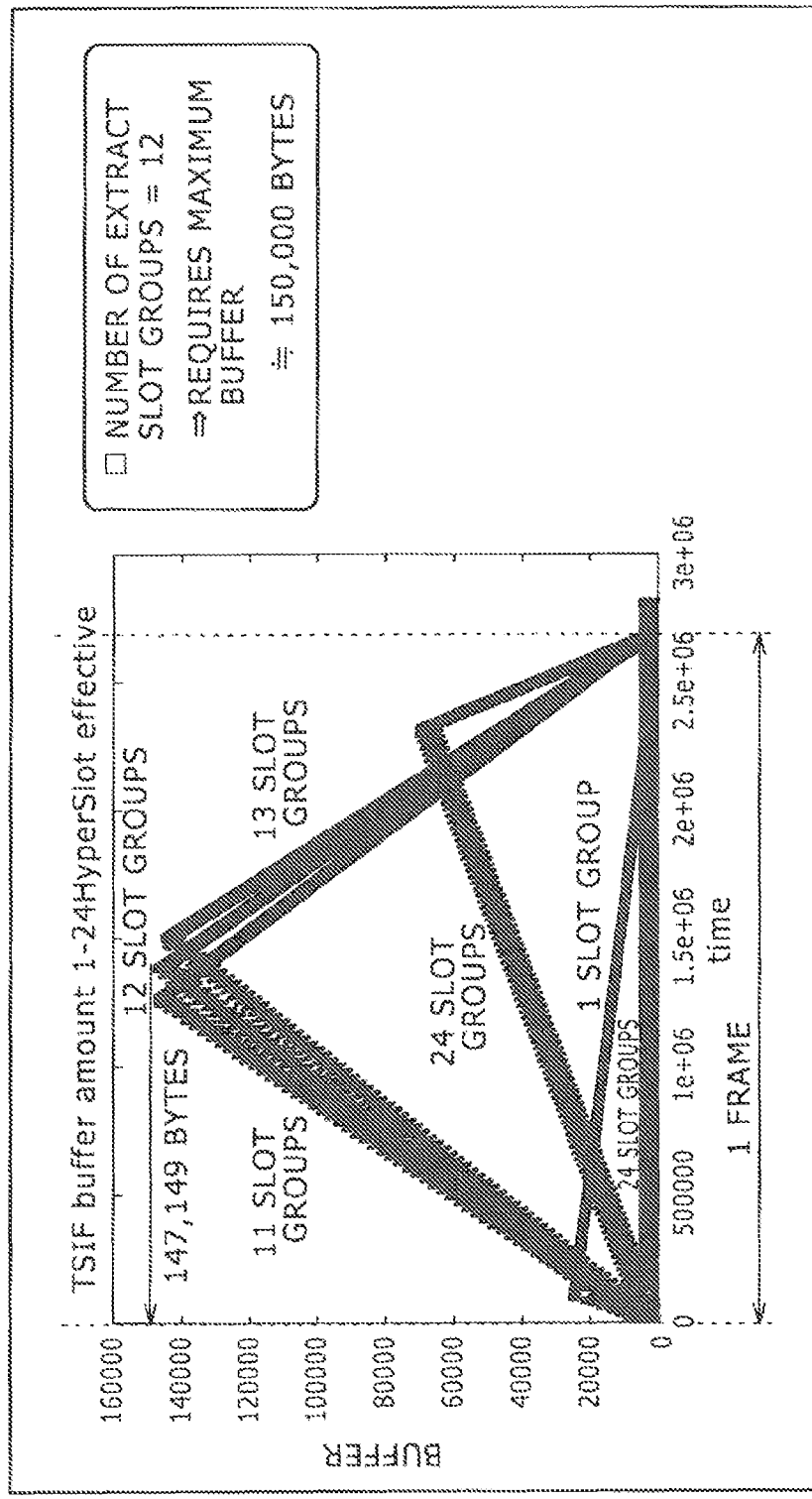
FIG. 20 is a diagram indicative of a simulation result of the data remaining amount of a ring buffer 71 when slots subject to extraction are not changed.

Referring to FIG. 20, there is shown a diagram indicative of simulation results of the remaining data amount of the ring buffer 71 (FIG. 19) if the change of slots subject to extraction is not executed.

It should be noted that, in FIG. 20, like FIG. 18, the horizontal axis represents the time with one pulse of the pulses of frequency 82 MHz being one time and the vertical axis represents remaining data amount in bytes.

The slots subject to extraction of the frame are written to the ring buffer 71 with a certain write rate. Then, the slots subject to extraction of one frame written to the ring buffer 71 are read from the ring buffer 71 with a read rate at which the reading can be executed within the time of one frame.

Now, if the reading of the slots subject to extraction written to the ring buffer 71 is started as early as possible, then the remaining data amount becomes larger in the case where the slots subject to extraction are at consecutive locations in the frame than the case where the slots subject to extraction are at intermittent locations in the frame.

FIG. 20 shows the remaining data amounts of the ring buffer 71 when one slot group, 11 slot groups, 12 slot groups, 13 slot groups, 20 slot groups, and 24 slot groups at consecutive locations in one frame are the slots subject to extraction, respectively.

As the number of slots subject to extraction increases, the number of slots subject to extraction to be written to the ring buffer 71 increases; however, as the number of slots subject to extraction to be written to the ring buffer 71 increases, the slots subject to extraction written to the ring buffer 71 are read at higher read rates.

Therefore, if the number of slots subject to extraction is relatively small, the number of slots subject to extraction to be written to the ring buffer 71 is small, thereby preventing the remaining data amount of the ring buffer 71 from increasing.

On the other hand, if the number of slots subject to extraction is relatively large, the rate of reading from the ring buffer 71 becomes larger, thereby preventing the remaining data amount of the ring buffer 71 from increasing.

The remaining data amount of the ring buffer 71 is maximized to 147149 bytes if the number of slots subject to extraction, namely, the number of slots subject to extraction to be written to the ring buffer 71 are in the 12 slot groups that is an intermediate value (½ of the number of slots of one frame).

Therefore, if the change of slots subject to extraction is not executed, the ring buffer 71 can use a memory of about 1.2 Mb≈147149 bytes×8 bits in the TS reproduction block 35 (FIG. 10).

In this case, as compared with the case shown in FIG. 15 where a memory of about 4.6 Mb must be used for the ring buffer 51, the scale and cost of the reception apparatus (FIG. 10) can be further prevented from getting larger (or the scale and cost can be lowered).

Meanwhile, if the ring buffer 51 (FIG. 15) is used in the TS reproduction block 35 (FIG. 10) and the slots subject to extraction are changed from the last one slot group #24 of one frame to all of the 24 slot groups #1 through #24 (the remaining data amount rapidly goes up to the maximum) as described above with reference to FIG. 17, the adjusted data in which the last one slot group #24 of the frame #t−1 is seamlessly connected to all of 24 slot groups #1 through #24 of frame #t before and after the change of slots subject to extraction as described above with reference to FIG. 17.

On the other hand, if the ring buffer 71 (FIG. 19) is used in the TS reproduction block 35 (FIG. 10), the change of slots subject to extraction is not considered in the capacity of the ring buffer 71, so that outputting the adjusted data in which the slot group before the change of slots subject to extraction and the slot group after the change of slots subject to extraction are seamlessly connected together may cause an overflow in the ring buffer 71.

Meanwhile, in the TS reproduction block 35, the change of slots subject to extraction must be executed in the two cases; a channel operation for changing channels has been executed and slots in which program data is included have been changed in the reception apparatus (FIG. 10) of the channel while a same channel is being received by this reception apparatus.

If the change of slots subject to extraction is required by a channel operation, the adjusted data in which a short temporal gap is caused between the slot group before the change of slots subject to extraction and the slot group after the change is outputted from the TS reproduction block 35; if the screen and sound get in the blanking state in the part of this gap, the user does not feel (to a great degree) that something is wrong.

If the change of slots subject to extraction in which program data is included is required by the change of the slots in which program data is included at the time of program switching for example in the transmission apparatus, the adjusted data in which a short temporal gap is caused between the slot group before the change of slots subject to extraction and the slot group after the change is outputted from the TS reproduction block 35; if the screen and sound get in the blanking state in the part of this gap, the user does not feel that something is wrong.

Therefore, as shown in FIG. 19, use of a memory of a small capacity of about 1.2 Mb described above with reference to FIG. 20 is enabled for the ring buffer 71 by permitting at the time of the change of slots subject to extraction that the adjusted data in which a short temporal gap is caused between the slot group before the change of slots subject to extraction and the slot group after the change is outputted to put the screen and sound into the blanking state in the part of this gap.

It should be noted that, in the advanced BS, the slots (or the slot groups) in which program data is included can be changed with a timing other than the program switching, timing in the transmission apparatus.

However, if the slots in which program data is included are changed with a timing other than the program switching timing in the transmission apparatus and the slots subject to extraction are changed in the TS reproduction block 35 shown in FIG. 19, then the adjusted data in which a short temporal gap is caused between the slot group before the change of slots subject to extraction and the slot group after the change is outputted.

In this case, in the part of the gap of the adjusted data halfway in a program, the screen and sound get in the blanking state, thereby possibly making the user feel that something is wrong.

Therefore, it is desirable in the operation of the transmission apparatus that the changing of slots in which program data is included with a timing other than the program switching timing be restricted.

This operational restriction allows the use of a memory of a small capacity of about 1.2 Mb≈147149 bytes×8 bits for the ring buffer 71, thereby reducing the scale and cost of the reception apparatus (FIG. 10) as compared with the case shown in FIG. 15 in which a memory of about 4.6 Mb must be used for the ring buffer 51.

Referring to FIG. 21, there is shown a timing chart indicative of an operation of the TS reproduction block 35 shown in FIG. 19 in which slots subject to extraction are changed by changing the slots in which program data is included at the time of program switching in the transmission apparatus.

In FIG. 21, in the transmission apparatus based on the advanced BS, the slots in which program data is included are changed at the time of program switching, resulting in the change of slots subject to extraction in the frame #t.

To be more specific, in FIG. 21, for the frames up to the frame #t−1, the last slot group #24 (fives slots thereof) of the 24 slot groups #1 through #24 making up one frame is the slots in which program data is included; for the frames subsequent to frame #t, all of the slot groups #1 through #24 (120 slots thereof) making up one frame are the slots in which program data is included.

In this case, for example, for the frame #t−3, the TS reproduction block 35 extracts the slot group #24 (five slots thereof) that is the slots subject to extraction from the frame #t−3 and writes the extracted slot group to the ring buffer 71.

For the slot group #24 of the frame #t−3 written to the ring buffer 71, the reading from the ring buffer 71 is started immediately after the start of this writing. The reading of the slot group (Slot Gp) #24 of the frame #t−3 written to the ring buffer 71 is executed during the time of one frame to be supplied to the output portion 76.

The output portion 76 is in a default state, thereby selecting the output of the ring buffer 71. Therefore, the output portion 76 outputs the slot group #24 of the frame #t−3 supplied from the ring buffer 71 (to the decoder 36 (FIG. 10)) as the adjusted data.

In FIG. 21, in the transmission apparatus based on the advanced BS, the slots in which program data is included are changed in the frame #t in which program switching is executed. Hence, in the transmission apparatus based on the advanced BS, change notice information is transmitted as included in TMCC information in the frame #t−2 that is two frames before the frame #t.

In the TS reproduction block 35 of the reception apparatus (FIG. 10), the change notice information transmitted from the transmission apparatus based on the advanced BS is detected by the change event detection portion 74 and detection information indicative of this detection of the change notice information is supplied to the read/write control portion 73.

If the detection information supplied from the change event detection portion 74 is indicative that the change notice information has been detected, the read/write control portion 73 identifies, from this change notice information, that a frame with which the change of slots subject to extraction is to be started (hereafter referred to also as a change start frame) is the frame #t that is two frames after the frame #t−2 in which the change notice information has been detected.

In addition, the read/write control portion 73 stops the writing to the ring buffer 71 of the frame #t−2 and frame, #t−1 from the frame #t−2 in which the change notice information has been detected to the frame #t−1 that is the frame immediately before the frame #t that is the change start frame.

Then, after the end of reading the slot group #24 of the frame #t−3 from the ring buffer 71, the read/write control portion 73 clears the ring buffer 71 (the contents stored therein) and, at the same time, outputs, to the output portion 76, selection information for specifying the selection of a null packet to be outputted from the dummy data output portion 75.

Consequently, in the output portion 76, after the end of the reading of the slot group #24 of the frame #t−3 from the ring buffer 71, the null packet outputted from the dummy data output portion 75 is outputted as the adjusted data.

In FIG. 21, the reading of the slot group #24 of the frame #t−3 is executed during the time of one frame slightly shifted in the temporally preceding direction from the timing of the frame #t−2, after which the ring buffer 71 is cleared and the null packet is outputted.

When the timing of the frame #t that is the change start frame is reached after the clearing of the ring buffer 71 and the outputting of the null packet, the read/write control portion 73 restarts the writing of slots to the ring buffer 71 (clears the stop of writing).

To be more specific, for the frame #t, the TS reproduction block 35 extracts the slot groups #1 through #24 that are slots subject to extraction from the frame #t and writes the extracted slot groups to the ring buffer 71.

Immediately before the writing of the slot groups #1 through #24 that are slots subject to extraction of the frame #t is started, the ring buffer 71 is cleared and the reading from the ring buffer 71 is not executed.

Therefore, after the start of writing the slot groups #1 through #24 that are the slots subject to extraction of the frame #t to the ring buffer 71, the read/write control portion 73 immediately starts the reading of these slot groups #1 through #24 from the ring buffer 71 (by taking time of one frame).

In addition, the read/write control portion 73 supplies the selection information for specifying the selection of the output of the ring buffer 71 to the output portion 76.

As a result, the output portion 76 gets in a default state, thereby selectively outputs, as the adjusted data, the slot groups #1 through #24 of the frame #t read from the ring buffer 71.

As described above, in the TS reproduction block 35, if the change notice information supplied from the transmission apparatus based on the advanced BS is detected in the change event detection portion 74, the frame #t that is the change start frame is identified from the detected change notice information.

Further, in the TS reproduction block 35, the writing of slots subject to extraction to the ring buffer 71 is stopped with the timing of the frame #t−1 immediately before the change start frame #t and the timing of the frame #t−2 immediately before the frame #t−1.

Also, in the TS reproduction block 35, after the end of the reading of the slot (slot group) written to the ring buffer 71 so far, namely, the slot group #24 that is the slots subject to extraction of the frame #t−3, the ring buffer 71 is cleared and the null packet to be outputted from the dummy data output portion 75 is selected by the output portion 76 as the adjusted data, which is outputted.

Consequently, with the timing of the frame #t−1 immediately before the change start frame #t, the ring buffer 71 is in the cleared state and the null packets to be outputted from the dummy data output portion 75 is selectively outputted as the adjusted data by the output portion 76.

Then, in the TS reproduction block 35, the writing of slots subject to extraction to the ring buffer 71 from the change start frame #t is restarted. Further, in the output portion 76, the frames subsequent to the change start frame #t are put in a default state and the slot groups #1 through #24 that is the slots subject to extraction to be read from the ring buffer 71 are selectively outputted as the adjusted data.

As described above, with the timing of the frame #t−1 immediately before the change start frame #t, the output portion 76 selectively outputs, as the adjusted data, (the null packet outputted from the dummy data output portion 75, thereby stopping the writing of the slots subject to extraction to the ring buffer 71. As a result, as shown in FIG. 21, the remaining data amount of the ring buffer 71 is prevented from rapidly goes up at the time of changing slots subject to extraction.

It should be noted that, as described above, with the timing of the frame #t−1 immediately before the change start frame #t, the output portion 76 selectively outputs, as the adjusted data, the null packet outputted from the dummy data output portion 75.

While the output portion 76 outputs the null packet as the adjusted data, the screen and sound are in the blanking state.

However, the output portion 76 outputs the null packet as the adjusted data in a short time equivalent to approximately the time of one frame and the blanking state of such a short time occurs with the timing of program switching (immediately before the switching to a new program), so that the user does not feel that something is wrong.

Referring to FIG. 22, there is shown a timing chart indicative of an operation of the TS reproduction block 35 shown in FIG. 19 when slots subject to extraction are changed by a channel operation done by the user in the transmission apparatus.

In FIG. 22, a channel operation is done by the user with the timing of the frame #t-1, thereby changing slots subject to extraction in the frame #t.

To be more specific, in FIG. 22, for the frames up to the frame #t-1, the last slot group #24 (five slots thereof) of the 24 slot groups #1 through #24 making up one frame is the slots subject to extraction; for the frames subsequent to the frame #t, all of the slot groups #1 through #24 (120 slots thereof) making up one frame are the slots subject to extraction.

In this case, for the frame #t-3 for example, the TS reproduction block 35 extracts the slot group #24 (five slots thereof) that is the slots subject to extraction from the frame #t-3 and writes the extracted slot group to the ring buffer 71.

For the slot group #24 of the frame #t-3 written to the ring buffer 71, the reading from the ring buffer 71 is started immediately after the start of this writing. The reading of the slot group (Slot Gp) #24 of the frame #t-3 written to the ring buffer 71 is executed during the time of one frame and the read slot group is supplied to the output portion 76.

The frame #t-2 is processed in the same manner as the frame #t-3.

To be more specific, for the frame #t-2, the TS reproduction block 35 extracts the slot group #24 that is the slots subject to extraction from the frame #t-2 and writes the extracted slot group to the ring buffer 71.

For the slot group #24 of the frame #t-2 written to the ring buffer 71, the reading from the ring buffer 71 is started immediately after the stat of this writing. The slot group #24 of the frame #t-2 read from the ring buffer 71 is supplied to the output portion 76.

The output portion 76 selects the output of the ring buffer 71 and outputs, as the adjusted data, the slot group #24 of the frame #t-2 supplied from the ring buffer 71.

It should be noted that the reading of the slot group #24 of the frame #t-2 from the ring buffer 71 is executed by taking about the time of the frame #t-1 immediately from the start of writing of the slot group #24 of this frame #t-2; in FIG. 22, a channel operation is done halfway in the frame #t-1.

In the TS reproduction block 35 of the reception apparatus (FIG. 10), a channel operation is detected by the change event detection portion 74 and detection information indicative that a channel operation has been detected is supplied to the read/write control portion 73.

If the detection information from the change event detection portion 74 is indicative that a channel operation has been detected, then the read/write control portion 73 identifies the frame #t immediately after the frame #t-1 in which the channel operation has been detected as the change start frame from which the change of slots subject to extraction is started.

In addition, the read/write control portion 73 stops the writing of slots to the ring buffer 71 after the detection of the channel operation and immediately before the frame #t that is the change start frame, namely, in the interval from the detection of the channel operation up to the last of the frame #t-1.

Then, when, after the detection of the channel operation, the reading up to the (temporally) farthest part in which a normal TS packet is obtained of the slot group #24 of the frame #t-2 from the ring buffer 71 is ended, the read/write control portion 73 clears the ring buffer 71 and outputs, to the output portion 76, the selection information for specifying the selection of the null packet to be outputted from the dummy data output portion 75.

Consequently, in the output portion 76, the null packet is outputted as the adjusted data after the end of the reading up to the farthest part in which a normal TS packet is obtained of the slot group #24 of the frame #t-2.

Here, in FIG. 22, the part read from the ring buffer 71 with the timing of the detection of a channel operation is the farthest part in which a normal TS packet is obtained, so that the ring buffer 71 is cleared and the null packet is outputted immediately after the detection of the channel operation.

Next, when the timing of the frame #t that is the change start frame is reached, the read/write control portion 73 restarts the writing of slots to the ring buffer 71 (clears the stop of writing).

To be more specific, for the frame #t, the TS reproduction block 35 extracts the slot groups #1 through #24 that are the slots subject to extraction from the frame #t and writes the extracted slot groups to the ring buffer 71.

Immediately before the start of writing of the slot groups #1 through #24 that are the slots subject to extraction of the frame #t, the ring buffer 71 is cleared and the reading from the ring buffer 71 is not executed.

Hence, after the start of writing the slot groups #1 through #24 that are the slots subject to extraction of the frame #t to the ring buffer 71, the read/write control portion 73 immediately starts the reading of these slot groups #1 through #24 from the ring buffer 71 (by taking the time of one frame).

In addition, the read/write control portion 73 supplies the selection information for specifying the selection of the output of the ring buffer 71 to the output portion 76.

As a result, the output portion 76 gets in (or returns to) the default state and selectively outputs the slot groups #1 through #24 of the frame #t read from the ring buffer 71 as the adjusted data.

As described above, in the TS reproduction block 35, when a channel operation is detected by the change event detection portion 74, the frame #t next to the frame #t-1 in which this channel operation has been detected is identified as the change start frame.

In addition, in the TS reproduction block 35, the writing of the slots subject to extraction to the ring buffer 71 after the detection of the channel operation is stopped halfway with the timing of the frame #t-1 immediately before the change start frame #t and, at the same time, the ring buffer 71 is cleared after the end of the reading up to the farthest part in which a normal TS packet is obtained of the slots (slot groups) so far written to the ring buffer 71.

With the timing of the frame #t-1 immediately before the change start frame #t, after the detection of a channel operation, the null packet outputted from the dummy data output portion 75 is selectively outputted from the output portion 76 as the adjusted data after the reading up to the farthest part in which a normal TS packet is obtained of the data of the slot group #24 of the frame #t-2 written to the ring buffer 71.

Then, in the TS reproduction, block 35, the writing of the slot groups #1 through #24 that are the slots subject to extraction to the ring buffer 71 is restarted from the change start frame #t and then the reading of the slots from the ring buffer 71 is started. Further, for the frames subsequent to the change start frame #t, the output portion 76 gets in the default state, thereby selectively outputting the slot groups #1 through #24 that are the slots subject to extraction read from the ring buffer 71 as the adjusted data.

As described above, with the timing of the frame #t-1 immediately before the change start frame #t, the output portion 76 outputs the null packet as the adjusted data, so that, after the detection of a channel operation, the writing of the slots subject to extraction to the ring buffer 71 can be stopped. As a result, as shown in FIG. 22, the remaining data amount of the ring buffer 71 can be prevented from rapidly going up at the time of changing slots subject to extraction.

It should be noted that, as described above, with the timing of the frame #t−1 immediately before the change start frame #t, the output portion 76 selectively outputs the null packet outputted from the dummy data output portion 75 as the adjusted data after the detection of a channel operation (after the end of the reading up to the farthest part in which a normal TS packet is obtained).

While the output portion 76 outputs the null packet as the adjusted data, the screen and sound are in the blanking state.

However, the output portion 76 outputs the null packet as the adjusted data in a short time less than the time of one frame and the blanking state taking place in such a short time is caused immediately after the execution of the channel operation, so that the user does not feel that something is wrong if the blanking state takes place.

[Processing by the TS Reproduction Block 35]

Referring to FIG. 23, there is shown a flowchart indicative of the processing (data processing) that is executed by the TS reproduction block 35 shown in FIG. 19 that is a data processing apparatus to which the present invention is applied.

In the TS reproduction block 35, in step S11, the read/write control portion 73 recognizes slots subject to extraction on the basis of indication information supplied from the slot-subject-to-extraction indication portion 72.

Next, the read/write control portion 73 executes read/write control on the ring buffer 51 for controlling the write point WP and the read point RP so as to read/write the slots subject to extraction of the slots of one frame supplied from the FEC block 34 (FIG. 10).

Under the read/write control of the read/write control portion 73, the ring buffer 71 writes the slots subject to extraction (or the slots specified to be slots subject to extraction) of the slots of one frame supplied from the FEC block 34 to the write point WP of the ring buffer 71 and reads the slots subject to extraction extracted from one frame from the read point of the ring buffer 71 by taking the time of one frame, thereby adjusting the rate of the slots subject to extraction and supplies the adjusted slots subject to extraction to the output portion 76.

The output portion 76 selectively outputs, as the adjusted data, the slots subject to extraction with the rate adjusted supplied from the ring buffer 71.

Next, in step S12, the change event detection portion 74 determines whether a change event for changing slots subject to extraction has been detected or not.

If a change event is found not having been detected in step S12, namely, if none of change notice information and a channel operation is found to have been detected by the change event detection portion 74, then the procedure returns to step S11.

If a change event is found to have been detected in step S12, namely, if either change notice information is found to have been detected or a channel operation is found to have been detected by the change event detection portion 74, then the change event detection portion 74 supplies the detected information to the read/write control portion 73, upon which the procedure goes to step S13.

In step S13, in accordance with the detected information supplied from the change event detection portion 74, the read/write control portion 73 stops the writing of slots to the ring buffer 71 and then clears the ring buffer 71 with a proper timing as described before with reference to FIG. 21 or FIG. 22.

Further, the read/write control portion 73 identifies a change start frame from the detected information supplied from the change event detection portion 74.

Next, in step S14, the read/write control portion 73 supplies the selection information for specifying the selection of the null packet to the output portion 76, upon which the output portion 76 starts to selectively output, as the adjusted data, the null packet outputted from the dummy data output portion 75.

Then, in step S15, the read/write control portion 73 determines whether the frame supplied from the FEC block 34 (FIG. 10) to the ring buffer 71 is a change start frame or not.

If the frame to be supplied to the ring buffer 71 is found not to be a change start frame in step S15, then the procedure returns to step S15.

If the frame to be supplied to the ring buffer 71 is found to be a change start frame in step S15, then the procedure goes to step S16, in which the read/write control portion 73 restarts the writing of slots to the ring buffer 71.

Further, in step S17, the read/write control portion 73 supplies the selection information for specifying the output of the ring buffer 71 to the output portion 76, upon which the output portion 76 stops the outputting (selecting) of the null packet, thereby starting to selectively output the slots read from, the ring buffer 71 as the adjusted data.

Subsequently, the procedure returns from step S17 to step S11 to repeat the above-mentioned processing therefrom.

According to the data processing described above with reference to FIG. 23, the read/write control portion 73 executes the read/write control in which the slots subject to extraction of two or more slots of one frame are written to the ring buffer 71 storing at least some of two or more slots making up a frame that is a collection of two or more slots providing the unit of error correction coding and the slots subject to extraction of one frame written to the ring buffer 71 are read within the time of one frame that is a preset unit time.

In addition, in the output portion 76, the output processing is executed in which the slots subject to extraction to be read from the ring buffer 71 or the null packet as dummy data to be outputted from the dummy data output portion 75 is outputted as the adjusted data with the rate adjusted.

Then, in this output processing, when slots subject to extraction are changed, the null packet is outputted as the adjusted data with the timing of the frame immediately before the change start frame from which the change of slots subject to extraction starts and, for the frames subsequent to the change start frame, the slots subject to extraction read from the ring buffer 71 are outputted as the adjusted data.

Specifically, if change notice information telling the change of slots in which program data is included is detected by the change event detection portion 74, then the read/write control portion 73 identifies the change start frame from the detected change notice information.

Next, as described before with reference to FIG. 21, the read/write control portion 73 stops the writing of slots subject to extraction to the ring buffer 71 with the timing of the frame immediately before the change start frame when the slots subject to extraction are changed by changing the slots in which program data is included in the transmission apparatus and, at the same time, clears the ring buffer 71 to restart the writing of the slots subject to extraction to the ring buffer 71 from the change start frame.

In addition, as described above with reference to FIG. 21, the output portion 76 outputs, as the adjusted data, the null packet or the slots subject to extraction read from the ring buffer 71.

If a channel operation is detected by the change event detection portion 74, then the read/write control portion 73 identifies the frame immediately after the frame in which the detected channel operation has been executed as a change start frame.

Next, as described above with reference to FIG. 22, if the slots subject to extraction are changed by a channel operation, the read/write control portion 73 stops the writing of the slots subject to extraction to the ring buffer 71 with the timing of the frame immediately before the change start frame and, at the same time, clears the ring buffer 71 to restart the writing of the slots subject to extraction to the ring buffer 71 from the change start frame.

Further, as described above with reference to FIG. 22, the output portion 76 outputs, as the adjusted data, the null packet or the slots subject to extraction read from the ring buffer 71.

As a result, the screen and sound are put in the blanking state in short time about one frame; for the ring buffer 71, a memory having a small capacity can be used to effectively reduce the scale and cost of the reception apparatus (FIG. 10).

[The Capacity of the Ring Buffer 71]

Referring to FIG. 24, there is shown a diagram describing a capacity necessary for the ring buffer 71 shown in FIG. 19.

To be more specific, FIG. 24A is a timing chart for explaining the writing of slots (slots subject to extraction) to the ring buffer 71 and the reading of the slots from the ring buffer 71 if all 24 slot groups #1 through #24 making up one frame based on the advanced BS are slots subject to extraction.

In the advanced BS, one frame (the time thereof) is about 34.2 ms (milliseconds) and one slot (the time thereof) is about 0.285 ms (=32.4 ms/120 slots).

If the operation clock of the TS reproduction block 35 is a clock of 82 MHz and the time of one pulse of the clock of 82 MHz is one cycle, then one frame is about 2804400 cycles (=32.4 ms×82 MHz) and one slot is about 23370 cycles (=0.285 ms×82 MHz).

The data of 5049 bytes in a slot (FIG. 11) is packed to the head side (the side preceding in time) for example and the slot having the data thus packed is supplied from the FEC block 34 (FIG. 10) to the ring buffer 71 (FIG. 19) of the TS reproduction block 35.

Here, let the cycle of writing 1-byte data to the ring buffer 71 be write cycle w and write cycle w be one cycle, then the data of one slot is written to the ring buffer 71 in 5049 cycles.

The data of the slot (the slot extracted from one frame) of one frame written to the ring buffer 71 is read from the ring buffer 71 in the time of one frame.

Therefore, if all 24 slot groups #1 through #24 making up one frame are slots subject to extraction, then the data of one slot written to the ring buffer 71 is read from the ring buffer 71 in the time of one slot.

Here, let the cycle of reading the data of one byte from the ring buffer 71 be read cycle r.

If all 24 slot groups #1 through #24 making up one frame are slots subject to extraction, then the data of 5049 bytes that is the data of one slot is read in about 23370 cycles that is the cycles of one slot, so that the read cycle r is about 4.63 cycles (=23370 cycles/5049 bytes).

Here, the read cycle r in the case where all of the slot groups making up one frame are slots subject to extraction is referred to also as standard read cycle a.

FIG. 24B is indicative of the remaining data amount of the ring buffer 71 if all 24 slot groups #1 through #24 making up one frame are slots subject to extraction.

Assume here for the simplicity of explanation that the reading of data in the slot from the ring buffer 71 be started at the same time as the starting of writing of the data in the slot extracted from one frame to the ring buffer 71.

For one slot, the writing of data to the ring buffer 71 is executed from the first (head) cycle to the 5049th cycle of one slot with write cycle w that is one cycle, thereby writing the data of 5049 bytes of one slot to the ring buffer 71.

Further, for one slot, the reading of data from the ring buffer 71 is executed all over one slot with read cycle r that is a cycle higher than write cycle w, thereby reading the data of 5049 bytes of one slot written to the ring buffer 71 in the time of one slot if all 24 slot groups #1 through #24 making up one frame are slots subject to extraction.

In this case, the remaining data amount of the ring buffer 71 is maximized at the 5049th cycle of one slot at which the writing of the data of one slot to the ring buffer 71 is completed.

To be more specific, at the 5049th cycle of one slot, the writing of data of 5049 bytes of one slot is completed and the reading of data from the ring buffer 71 is executed from the first cycle of one slot to the 5049th cycle in the read cycle r (in this case, the standard read cycle a).

Therefore, at the 5049th cycle of one slot, the data of 5049 bytes has been written to the ring buffer 71 and the data of 5059/r bytes has been read from the ring buffer 71, so that the remaining data amount of the ring buffer 71 is 5049−5049/r bytes; if all 24 slot groups #1 through #24 making up one frame are slots subject to extraction, these 5049−5049/r bytes becomes the maximum value of the remaining data amount of the ring buffer 71 (hereafter referred to as the maximum remaining data amount).

It should be noted that, if all 24 slot groups #1 through #24 making up one frame are slots subject to extraction, then the read cycle r is about 4.63 cycles and the maximum value of the remaining data amount of the ring buffer 71 is about 3959 bytes≈5049−5049/4.63 as described above.

Here, the writing of slot data is not executed in a period between the 5050th cycle next to the 5049th cycle of a slot at which the writing of data of one slot ends to the last of the slot, so that this period is referred to also as a non-write period.

A period other than the non-write period of one slot, namely, a period between the first cycle of a slot and the 5049th cycle in which the data of 5049 bytes of the slot is written is referred to also as a write period.

If all 24 slot groups #1 through #24 making up one frame are slots subject to extraction, the data of 5049 bytes of the slot is written to the ring buffer 71 in the write period of one slot and the reading of data from the ring buffer 71 is executed in the standard read cycle a.

As a result, the remaining data amount of the ring buffer 71 at the end of the write period of one slot becomes 5049−5059/a bytes.

In the non-write period of one slot, the data of 5049−5049/a byes that are the remaining data amount of the ring buffer 71 are read in the standard read cycle a.

It should be noted that the write period and the non-write period are provided for those slots which are slots subject to extraction; for the slots that are not slots subject to extraction, only the non-write period is provided (all periods for those slots which are not slots subject to extraction provide a non-write period).

In what follows, in order to explain capacities necessary for the ring buffer 71 (FIG. 19), it is assumed that the slots be the slots subject to extraction in which there are both the write period and the non-write period, unless otherwise noted.

FIG. 24C is indicative of a remaining data amount of the ring buffer 71 when the first slot group #1 of the 24 slot groups #1 through #24 making up one frame contains slots subject to extraction.

Here, if the slots subject to extraction are 12 slot groups that is ½ of the 24 slot groups #1 through #24, making up one frame, for example, then the data of these 12 slot groups is written to the ring buffer 71 to be read in the time of one frame in the TS reproduction block 35.

Therefore, if the slots subject to extraction are 12 slot groups that is ½ of 24 slot groups #1 through #24 making up one frame, then the data in a data amount equal to ½ of the case where the slots subject to extraction are all the slot groups making up one frame (hereafter also referred to as the case where all slot groups are processed) is read in the time of one frame that is the same as the case where all slot groups are processed, so that the data of one byte is read by taking a time twice as long as the case where all slot groups are processed, resulting in that the read cycle r becomes 2a that is twice the standard read cycle a in the case where all slot groups are processed.

Therefore, if the slots subject to extraction are the 12 slot groups that is ½ of the case where all slot groups are processed, the data of 5049 bytes of the slot is written to the ring buffer 71 in the write period of one slot and the reading of the data from the ring buffer 71 is executed in read cycle r=2a.

As a result, the remaining data amount of the ring buffer 71 at the end of the write period of one slot becomes 5049−5049/(2a) bytes.

Next, in the non-write period of one slot, the data from the ring buffer 71 is read in read cycle r=2a.

If all slot groups are processed, all of the data of 5049−5049/a bytes that is the remaining data amount of the ring buffer 71 are read in the standard read cycle a in the non-write period of one slot as described with reference to FIG. 24B.

If the read cycle r is 2a cycle that is twice the standard read cycle a, then a data amount to be read in non-write period in that read cycle r=2a is (5049−5049/a)×(½) bytes that is ½ of data amount 5049−5049/a bytes that is read in the non-write period in the standard read cycle a.

Therefore, if the slots subject to extraction are 12 slot groups that is ½ of the case where all slot groups are processed, then a remaining data amount of the ring buffer 71 at the end of a write period of one slot is 5049−5049/(2a) bytes (assuming that the remaining data amount at the start of the write period be 0) and a data amount to be read in a subsequent non-write period is (5049−5049/a)×(½) bytes, so that a data amount to be accumulated in the ring buffer 71 during one slot is (5049−5049/(2a))−((5049−5049/a)×(½) bytes.

As described above, if the slots subject to extraction are 12 slot groups that are ½ of the case where all slot groups are processed, then the data of (5049−5049/(2a))−((5049−5049/a)×(½) bytes is accumulated in the ring buffer 71 during one slot.

Because the slots (the slots subject to extraction) of which data is accumulated in the ring buffer 71 are 60 slots=12 slot groups×5 slots, a maximum of data of {(5049−5049/(2a))−((5049−5049/a)×(½))} bytes×60 slots is accumulated in the ring buffer 71.

To be more specific, if the slots subject to extraction are 12 slot groups that is ½ of the case where all slot groups are processed, then a maximum remaining data amount of the ring buffer 71 is {(5049−5049/(2a))−((5049−5049/a)×(½))}×60 bytes.

Therefore, a capacity necessary for the ring buffer 71 is higher than {(5049−5049/(2a))−((5049−5049/a)×(½))}×60 bytes.

Likewise, if the slots subject to extraction are slot groups of 24×h (0<h<1) that is h times the case where all slot groups are processed, the data of a data amount h times the case where all slot groups are processed is read in the time of one frame that is the same time as the case where all slot groups are processed, so that the read cycle r becomes a/h that is 1/h of the case where all slot groups are processed.

Consequently, if the slots subject to extraction are 24h slot groups that is h times the case where all slot groups are processed, the data of 5049 bytes of the slots is written to the ring buffer 71 during the period of one slot and the reading of the data from the ring buffer 71 is executed in the read cycle r=a/h.

As a result, the remaining data amount of the ring buffer 71 at the end of the write period of one slot becomes 5049−5049/(a/h) bytes.

Next, in the non-write period of one slot, the reading from the ring buffer 71 is executed in the read cycle r=a/h.

In the case where all slot groups are processed, all of the data of 5049−5049/a bytes that is the remaining data amount of the ring buffer 71 are read in the standard read cycle a in the non-write period of one slot as described above with reference to FIG. 24B.

If the read cycle r is a/h cycle that is 1/h times the standard read cycle a, then a data amount to be read in the non-write period in this read cycle r=a/h becomes (5049−5049/a)×h bytes that is h times the data amount 5049−5049/a bytes to be read in the non-write period in the standard read cycle a.

Therefore, if the slots subject to extraction are 24h slot groups that are h times the case where all slot groups are processed, the remaining data amount of the ring buffer 71 at the end of the write period in one slot is 5049−5049/(a/h) bytes (assuming that the remaining data amount at the start of the write period be 0) and the data amount to read in the subsequent non-write period is (5049−5049/a)×h bytes, so that the data amount to be accumulated in the ring buffer 71 during one slot becomes (5049−5049/(a/h))−((5049−5049/a)×h) bytes.

As described above, if the slots subject to extraction are 24h slot groups that is h times the case where all slot groups are processed, the data of (5049−5049/(a/h))−((5049−5049/a)×h) bytes is accumulated in the ring buffer 71 during one slot.

Because the slots (the slots subject to extraction) in which data is accumulated in the ring buffer 71 as described above are 24h slot groups×5 slots, so that a maximum of the data of {(5049−5049/(a/h))−((5049−5049/a)×h)} bytes×120 slots is accumulated in the ring buffer 71.

To be more specific, if the slots subject to extraction are 24h slot groups that is h times the case where all slot groups are processed, the maximum remaining data amount of the ring buffer 71 becomes {(5049−5049/(a/h))−((5049−5049/a)×h)}×120h bytes.

Therefore, a capacity necessary for the ring buffer 71 is equal to or higher than {(5049−5049/(a/h))−((5049−5049/a)×h)}×120h bytes.

As shown in FIG. 24C, the case where the first one slot group #1 of the 24 slot groups #1 through #24 making up one frame is slots subject to extraction denotes the case where slots subject to extraction is 1=24×(1/24) slot groups that is h=1/24 times the case where all slot groups are processed.

Therefore, the maximum remaining data amount of the ring buffer 71 becomes {(5049−5049/(a/(1/24)))−((5049−5049/a)×(1/24))}×120×(1/24) bytes and the maximum remaining data amount of the ring buffer 71 becomes equal to or higher than $\{(5049-5049/(a/(1/24)))-((5049-5049/a)\times(1/24))\}\times120\times(1/24)$ bytes.

It should be noted that, in the above-mentioned $\{(5049-5049/(a/(1/24)))-((5049-5049/a)\times(1/24))\}\times120\times(1/24)$ bytes, the bytes in $(5049-5049/(a/(1/24)))$ that is the first half of the curly brackets { } are indicative of the remaining data amount of the ring buffer 71 at the end of the write period of one slot (assuming that the remaining data amount at the start of the write period be 0).

It should also be noted that $((5049-5049/a)\times(1/24))$ bytes that is the last half in the curly brackets { } are indicative of the data amount read from the ring buffer 71 during the subsequent non-write period.

For example, if the standard read cycle a is 4.63 cycles as described above, then the maximum remaining data amount of the ring buffer 71 in the case where the first one slot group #1 of the 24 slot groups #1 through #24 making up one frame is slots subject to extraction is about 24420 bytes $\approx\{(5049-5049/(4.63/(1/24))-((5049-5049/4.63)\times(1/24))\}\times120\times(1/24)$ bytes.

From the above-mentioned data, the maximum remaining data amount of the ring buffer 71 can be expressed as follows:

To be specific, multiple h is expressed by equation $h=n/m$ with n and m being positive integers satisfying relation $n<m$.

If the number of slot groups of one frame is expressed by N, then the number of slot groups k that is slots subject to extraction can be expressed by equation $k=Nh=N(n/m)(=N/(m/h))$.

Further, let the data amount of one slot be B bytes and the number of slots making up one slot group be S.

In this case, of the N slot groups making up one frame, if (the first) $k=N/(m/n)$ slot groups are slots subject to extraction, then the maximum remaining data amount R of the ring buffer 71 is expressed by equation $R=(B-B/((m/n)a)-(B-B/a)/(m/n))\times S\times(N/(m/n))$.

It should be noted that, in $R=(B-B/((m/n)a)-(B-B/a)/(m/n))\times S\times(N/(m/n))$, $B-B/((m/n)a)$ denotes the remaining data amount (assuming that the remaining data amount at the start of a write period be 0) of the ring buffer 71 at the end of a write period of one slot, $(B-B/a)/(m/n)$ denotes the data amount to be read from the ring buffer 71 in a subsequent non-write period.

By rearranging equation $R=(B-B/((m/n)a)-(B-B/a)/(m/n))\times S\times(N/(m/n))$, the maximum remaining data amount R of the ring buffer 71 can be expressed by equation $R=SN(B\times B(n/m))(n/m)$.

It should be noted that, if all of N slot groups of N slot groups making up one frame are slots subject to extraction, namely, if $m=n$, then the maximum remaining data amount R of the ring buffer 71 is expressed by equation $R=B-B/a$.

As described above, multiple h is expressed by equation $h=n/m$, so that, if equation $R=SN(B-B(n/m))(n/m)$ is expressed by use of h, equation $R=SN(B-Bh)h$ is provided.

If relation $SN(B-Bh)h>B-B/a$ is established, the case where the maximum remaining data amount R of the ring buffer 71 is maximized is the case where equation $R=SN(B-Bh)h$ is maximized; in the case of $h=1/2$ ($n=1$ and $m=2$), namely, if the slots subject to extraction are the slots (or the slot groups) equal to $h=1/2$ of the number of slots (or slot groups) N of one frame, equation $R=SN(B-Bh)h$ is maximized with $R=BSN/4$.

A capacity necessary for the ring buffer 71 is theoretically the maximum remaining data amount R (or higher than the maximum remaining data amount R) in the case where the maximum remaining data amount R of the ring buffer 71 is maximized; namely, BSN/4 bytes.

Here, SN denotes the number of slots of one frame (or a value obtained by multiplying the number of slot groups N of one frame by the number of slots S making up one slot group) and B denotes a data amount of one slot, so that BSN is a data amount of one frame. Therefore, the maximum value $R_{max}$ of the maximum remaining data amount R of the ring buffer 71 is ¼ times the data amount BSN of one frame.

Thus, a capacity necessary for the ring buffer 71 is theoretically becomes a value equal to (or higher than) BSN/4 bytes ¼ the data amount BSN of one frame.

In the advanced BS, the data amount B of one slot is 5049 bytes (at the maximum) and the number of slots SN in one frame is 120, so that the maximum value $R_{max}$ of the maximum remaining data amount of the ring buffer 71 becomes $R_{max}=BSN/4=5049$ bytes$\times120$ slots$/4=151470$ bytes. This value almost matches the simulation result shown in FIG. 20 in which the remaining data amount of the ring buffer 71 becomes a maximum of 147149 bytes in the case where the slots subject to extraction are 12 slot groups that is $h=1/2$ the number of slot groups 24 of one frame, namely, 60 slots that is $h=1/2$ of the number of slots 120 of one frame.

It should be noted that if no slot group exists, one slot can be regarded as one slot group and the number of slots S making up one slot group can be set to 1, thereby computing the maximum remaining data amount R of the ring buffer 71.

[Description of a Computer to which the Present Invention is Applied]

The sequence of processing operations described so far can be executed by hardware or software approach. When the sequence of processing operations is executed by software approach, programs making up the software are installed on a general-purpose computer for example.

Referring to FIG. 25, there is shown an exemplary configuration of a computer on which programs for executing the sequence of processing operations described above are installed.

These programs can be recorded to a hard disk drive 105 or a ROM 103 that are incorporated in the computer as recording media in advance.

Alternatively, the programs can be stored (or recorded) in a removable recording media 111 in advance. Such removable recording media 111 can be provided as so-called package software. The removable recording media 111 includes a flexible disc, a CD-ROM (Compact Disc Read Only Memory), an MO (Magneto Optical) disc, a DVD (Digital Versatile Disc), a magnetic disc, and a semiconductor memory, for example.

It should be noted that, in addition to the installation from the removable recording media 111 as above for example onto the computer, the programs can be downloaded through a communication network or a broadcasting network into the hard disk drive 105 in the computer. To be more specific, the programs can be transferred from a download site via an artificial satellite for digital satellite broadcasting into the computer in a wireless manner or via a network such as a LAN (Local Area Network) or the Internet, for example, into the computer in a wired manner.

The computer incorporates a CPU (Central Processing Unit) 102 connected to an input/output interface 110 via a bus 101.

The CPU 102 executes programs stored in a ROM (Read Only Memory) 103 in accordance with an instruction given by the user through an input block 107 via the input/output interface 110. In addition, the CPU 102 executes programs stored in the hard disk drive 105 by loading the programs into a RAM (Random Access Memory) 104.

Consequently, the CPU 102 executes processing operations in accordance with flowcharts or processing operations to be executed by configuration shown in the block diagram mentioned above. Then, the CPU 102 outputs the results of processing operations from an output block 106, transmits from a communication block 108, or records to the hard disk drive 105, for example, via the input/output interface 110, on an as required basis.

It should be noted that the input block 107 is made up of a keyboard, a mouse, and a microphone, for example. The output block 106 is made up of an LCD (Liquid Crystal Display) and a loudspeaker, for example.

It should also be noted that, herein, the programs to be executed by the computer may not be necessarily executed in a time-dependent manner in the sequences described herein with the flowchart. To be more specific, the processing operations to be executed by the computer as instructed by programs include those processing operations which are executed in parallel or discretely (the processing operations to be executed by parallel processing or object processing, for example).

Each of the programs may be executed by one computer (or processor) or two or more computers in a distributed manner. In addition, each of the programs may be transferred to a remote computer to be executed thereby.

While preferred embodiments of the present invention have been described using specific terms, such description is for illustrative purpose only, and it is to be understood that changes and variations may be made without departing from the spirit or scope of the following claims.

To be more specific, the present invention is applicable when some of the slots configured by the given number of slots in addition to the frames based on the advanced BS are written to a ring buffer and the slots written to the ring buffer (the slots written to the ring buffer, of the slots making up one frame) are read within a preset unit time such as a time equivalent to one frame.

It should be noted that, in addition to the case described above, the output portion 76 (FIG. 19) can also selectively output, as the adjusted data, a null packet outputted from the dummy data output portion 75 if the ring buffer 71 underflows.

DESCRIPTION OF REFERENCE NUMERALS

11 ... Antenna, 12 ... Tuner, 13 ... Demodulation block, 14 ... FEC block, 15 ... TS reproduction block, 16 ... Decoder, 21, 22 ... Frame buffers, 31 ... Antenna, 32 ... Tuner, 33 ... Demodulation block, 34 ... FEC block, 35 ... TS reproduction block, 36 ... Decoder, 41, 42 ... Frame buffers, 51 ... Ring buffer, 52 .... Slot-subject-to-extraction indication portion, 53 ... Read/write control portion, 71 ... Ring buffer, 72 ... Slot-subject-to-extraction indication portion, 73 ... Read/write control portion, 74 ... Change event detection portion, 75 ... Dummy data output portion, 76 ... Output portion, 101 ... Bus, 102 ... CPU, 103 ... ROM, 104 ... RAM, 105 ... Hard disk drive, 106 ... Output block, 107 ... Input block, 108 .... Communication block, 109 ... Drive, 110 ... Input/output interface, 111 ... Removable recording media

The invention claimed is:

1. A data processing apparatus comprising:
a memory configured to store, as a slot subject to extraction, at least a part of slots of a plurality of slots making up a frame that is a collection of said plurality of slots each providing a unit of error correction coding; and
circuitry configured to
execute read/write control in which said slot subject to extraction of said plurality of slots in one frame is written to said memory and said slot subject to extraction of said one frame written to said memory is read within a preset unit time;
output dummy data; and
execute output processing in which, when said slot subject to extraction is changed, said dummy data is outputted with a timing immediately before a change start frame from which the change of said slot subject to extraction is started and, for frames subsequent to said change start frame, said slot subject to extraction read from said memory is outputted.

2. The data processing apparatus according to claim 1, wherein, when said slot subject to extraction is changed, said circuitry stops writing of said slot subject to extraction to said memory with said timing immediately before said change start frame, clears said memory, and restarts writing of said slot subject to extraction to said memory from said change start frame.

3. The data processing apparatus according to claim 2, wherein said slot includes data of a program and, when said program is switched to another program, said slot subject to extraction is changed.

4. The data processing apparatus according to claim 3, wherein
a transmission apparatus configured to transmit said frame transmits change notice information for telling a change of slots in which said data of a program is included with a timing a predetermined number of frames before in which said program is switched to another program, and
said circuitry is configured to detect said change notice information from said transmission apparatus, said change start frame being identified from said change notice information.

5. The data processing apparatus according to claim 2, wherein said slot includes data of a program and, when a channel operation is done to select a program subject to viewing, said slot subject to extraction is changed.

6. The data processing apparatus according to claim 5, wherein
said circuitry is configured to detect said channel operation, and
a frame immediately after the detection of said channel operation provides said change start frame.

7. The data processing apparatus according to claim 1, wherein a capacity of said memory is a value higher than ¼ of a data amount of one frame.

8. The data processing apparatus according to claim 1, wherein said memory is a ring buffer.

9. A data processing method comprising the steps of:
storing, as a slot subject to extraction, at least a part of slots of a plurality of slots making up a frame that is a collection of said plurality of slots each providing a unit of error correction coding in a memory;
executing, by circuitry of a data processing apparatus, read/write control in which said slot subject to extraction of said plurality of slots in one frame is written to said memory and said slot subject to extraction of said one frame written to said memory is read within a preset unit time;
outputting dummy data; and
executing, by the circuitry, output processing in which, when said slot subject to extraction is changed, said dummy data is outputted with a timing immediately before a change start frame from which the change of said slot subject to extraction is started and, for frames subsequent to said change start frame, said slot subject to extraction read from said memory is outputted.

10. The data processing method according to claim 9, further comprising:
when said slot subject to extraction is changed,
stopping writing of said slot subject to extraction to said memory with said timing immediately before said change start frame,
clearing said memory, and
restarting writing of said slot subject to extraction to said memory from said change start frame.

11. The data processing method according to claim 10, wherein said slot includes data of a program and, when said program is switched to another program, said slot subject to extraction is changed.

12. The data processing method according to claim 11, wherein
a transmission apparatus configured to transmit said frame transmits change notice information for telling a change of slots in which said data of a program is included with a timing a predetermined number of frames before in which said program is switched to another program, and said data processing method further comprises:
detecting said change notice information from said transmission apparatus, said change start frame being identified from said change notice information.

13. The data processing method according to claim 10, wherein said slot includes data of a program and, when a channel operation is done to select a program subject to viewing, said slot subject to extraction is changed.

14. The data processing method according to claim 13, further comprising:
detecting said channel operation, wherein
a frame immediately after the detection of said channel operation provides said change start frame.

15. The data processing method according to claim 9, wherein a capacity of said memory is a value higher than ¼ of a data amount of one frame.

16. The data processing method according to claim 9, wherein said memory is a ring buffer.

17. A non-transitory computer-readable storage medium storing a program for causing a computer to:
store, as a slot subject to extraction, at least a part of slots of a plurality of slots making up a frame that is a collection of said plurality of slots each providing a unit of error correction coding in a memory;
execute read/write control in which said slot subject to extraction of said plurality of slots in one frame is written to said memory and said slot subject to extraction of said one frame written to said memory is read within a preset unit time;
output dummy data; and
execute output processing in which, when said slot subject to extraction is changed, said dummy data is outputted with a timing immediately before a change start frame from which the change of said slot subject to extraction is started and, for frames subsequent to said change start frame, said slot subject to extraction read from said memory is outputted.

* * * * *